(12) United States Patent
Van Der Velde et al.

(10) Patent No.: US 12,004,004 B2
(45) Date of Patent: *Jun. 4, 2024

(54) APPARATUS AND METHOD FOR CONTROLLING DATA FLOW IN WIRELESS COMMUNICATION SYSTEM

(71) Applicant: Samsung Electronics Co., Ltd., Suwon-si (KR)

(72) Inventors: Himke Van Der Velde, Staines (GB); Gert Jan Van Lieshout, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/306,747

(22) Filed: Apr. 25, 2023

(65) Prior Publication Data

US 2023/0262514 A1    Aug. 17, 2023

Related U.S. Application Data

(63) Continuation of application No. 17/240,114, filed on Apr. 26, 2021, now Pat. No. 11,665,579, which is a
(Continued)

(30) Foreign Application Priority Data

Dec. 12, 2016   (GB) ...................... 1621072

(51) Int. Cl.
*H04W 28/02*    (2009.01)
*H04W 84/04*    (2009.01)

(52) U.S. Cl.
CPC ...... *H04W 28/0268* (2013.01); *H04W 84/042* (2013.01)

(58) Field of Classification Search
None
See application file for complete search history.

(56) References Cited

U.S. PATENT DOCUMENTS 10,856,196 B2    12/2020   Xu et al.
2003/0202468 A1   10/2003   Cain et al.
(Continued)

FOREIGN PATENT DOCUMENTS

CN    105009678 A    10/2015
CN    105359582 A    2/2016
(Continued)

OTHER PUBLICATIONS

Great Britain Search and Examination Report dated Jun. 13, 2018, issued in Great Britain Application No. GB1720646.7.
(Continued)

*Primary Examiner* — Otis L Thompson, Jr.
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present disclosure provides apparatus and method for controlling data flow in wireless communication system. According to various embodiments of the present disclosure, a method of managing a data flow in a wireless communication system comprises controlling a quality of service (QoS) flow to be transferred from a first data radio bearer (DRB) to a second DRB. Herein, the QoS flow is a flow of data carried by a DRB between a terminal and at least one network entity.

20 Claims, 20 Drawing Sheets

Related U.S. Application Data continuation of application No. 16/468,981, filed as application No. PCT/KR2017/014583 on Dec. 12, 2017, now Pat. No. 10,993,138.

(56) References Cited

U.S. PATENT DOCUMENTS

| | | |
|---|---|---|
| 2006/0268797 A1 | 11/2006 | Cheng et al. |
| 2015/0215965 A1 | 7/2015 | Yamada |
| 2015/0373607 A1 | 12/2015 | Zhu |
| 2016/0029235 A1 | 1/2016 | Kim et al. |
| 2016/0037401 A1 | 2/2016 | Lee et al. |
| 2016/0080207 A1 | 3/2016 | Prakash et al. |
| 2016/0142970 A1 | 5/2016 | Chen et al. |
| 2016/0205547 A1 | 7/2016 | Rajadurai et al. |
| 2017/0013498 A1 | 1/2017 | Yi et al. |
| 2017/0099621 A1* | 4/2017 | Michaelsen ....... H04W 36/0033 |
| 2017/0188259 A1 | 6/2017 | Van Phan et al. |
| 2017/0265175 A1 | 9/2017 | Gandhi |
| 2017/0374665 A1 | 12/2017 | Lee et al. |
| 2017/0374672 A1 | 12/2017 | Selvaganapathy et al. |
| 2018/0007669 A1 | 1/2018 | Yi et al. |
| 2018/0146398 A1 | 5/2018 | Kim et al. |
| 2018/0242205 A1 | 8/2018 | Mildh et al. |
| 2018/0367288 A1 | 12/2018 | Vrzic et al. |
| 2018/0368101 A1 | 12/2018 | Agiwal et al. |
| 2019/0028920 A1 | 1/2019 | Pan |
| 2019/0182902 A1 | 6/2019 | Han et al. |
| 2019/0320476 A1 | 10/2019 | Wang et al. |
| 2019/0327642 A1 | 10/2019 | Peng et al. |
| 2020/0280872 A1 | 9/2020 | Fiorani et al. |
| 2020/0295902 A1 | 9/2020 | You |
| 2020/0322831 A1 | 10/2020 | Xu et al. |
| 2020/0389823 A1 | 12/2020 | Xu et al. |

FOREIGN PATENT DOCUMENTS

| | | |
|---|---|---|
| CN | 105981431 A | 9/2016 |
| EP | 2884673 A1 | 6/2015 |
| WO | 2015/115034 A1 | 8/2015 |
| WO | 2016/019999 A1 | 2/2016 |
| WO | 2016/021890 A1 | 2/2016 |
| WO | 2017/180263 A1 | 10/2017 |
| WO | 2018/026169 A1 | 2/2018 |
| WO | 2018/060546 A1 | 4/2018 |
| WO | 2018/071064 A1 | 4/2018 |

OTHER PUBLICATIONS

Great Britain Examination Report dated Apr. 15, 2019, issued in Great Britain Application No. GB1720646.7.
3GPP TSG RAN WG2 Meeting #95bis, DRB management and NR QoS, Kaohsiung, Oct. 10-14, 2016, R2-166113.
3GPP TSG-RAN WG2 Meeting #96, NR QOS model for UL and DL, Reno, USA, Nov. 14-18, 2016, R2-168057.
3GPP TSG-RAN WG2 Meeting #96bis, NR + NR DC: QOS Architecture, Spokane, USA, Jan. 17-19, 2017, R2-16xxxx.
3GPP TSG-RAN WG2 Meeting #96bis, Two levels for QOS flow mobility, Spokane, USA, Jan. 17-19, 2017, R2-16xxxx.
3GPP TSG-RAN WG2 Meeting #97, Data forwarding during HO between RAN nodes connected to NG Core, Athens, Greece, Feb. 13-17, 2017, R2-1701715.
3GPP TSG-RAN WG2 Meeting #97bis, Inter gNB Mobility, Spokane, USA, Apr. 3-7, 2017, R2-1702633.
3GPP TSG-RAN WG2 Meeting #97 bis, NR + NR DC: QOS Architecture, Spokane, US, Apr. 3-7, 2017, R2-1703252.
3GPP TSG-RAN WG2 NR Adhoc#2, offline discussion 7—QoS support in NR DC, Qingdao, China, Jun. 27-29, 2017, R2-1706780.
3GPP TSG-RAN WG2 NR Adhoc#2, offline discussion 7—QoS support in NR DC, Qingdao, China, Jun. 27-29, 2017, R2-1707493.
3GPP TSG-RAN WG2 Meeting #99, Consideration on the DRB and SRB parameters Transferred between MeNB and SgNB, Berlin, Germany, Aug. 21-25, 2017, R2-1708128.
3GPP TSG-RAN WG2 Meeting #99, Flow based QoS framework for E-UTRA connected to 5GC, Berlin, Germany, Aug. 21-25, 2017, R2-1708400.
3GPP TSG-RAN WG2 Meeting #99, QoS support in NR DC, Berlin, Germany, Aug. 21-25, 2017, R2-1708410.
3GPP TSG-RAN WG2 Meeting #100, Discussion on changing presence of SDAP header, Reno, USA, Nov. 27-Dec. 1, 2017, R2-1712207.
3GPP TS 23.501 V15.5.0 (Mar. 2019), 3rd Generation Partnership Project; Technical Specification Group Services and System Aspects; System Architecture for the 5G System; Stage 2 (Release 15).
3GPP TS 37.340 V15.5.0 (Mar. 2019), 3rd Generation Partnership Project; Technical Specification Group Radio Access Network; Evolved Universal Terrestrial Radio Access (E-UTRA) and NR; Multi-connectivity; Stage 2 (Release 15).
3GPP TS 38.300 V0.7.0 (Aug. 2017), 3rd Generation Partnership Project; Technical Specification Group Radio Access Network; NR; NR and NG-RAN Overall Description; Stage 2 (Release 15).
Rapporteur (NEC): 11 Introduction of Dual 7-12 Connectivity (RAN3 topics), R3-141480, 3rd Generation Partnership Project (3GPP), Mobile Competence Centre; 650, Route Des Lucioles ; F-06921 Sophia-Antipolis Cedex, France, May 24, 2014 (May 24, 2014), XP050821546, Retrieved from the Internet: URL: http://www.3gpp.org/ftp/tsg ran/WG3 lu/TSGR3 84/Docs/.
3rd Generation Partnership Project; Technical Specification Group Services and System Aspects; Study on Architecture for Next Generation System (Release 14), Dec. 1, 2016 (Dec. 1, 2016), XP051199312.
European Search Report dated Oct. 30, 2019, issued in European Application No. 17881508.0.
European Office Action dated Mar. 12, 2021, issued in European Application No. 17881508.0-1215.
Samsung; "NR QOS model for UL and DL"; 3GPP TSG-RAN WG2 Meeting #96; R2-168057; Nov. 5, 2016, Reno, USA.
European Office Action dated Jul. 1, 2020, issued in European Application No. 17881508.0-1215.
Chinese Office Action dated Jun. 28, 2022, issued in a counterpart Chinese Application No. 201780076182.2.
Korean Office Action with English translation dated Oct. 28, 2022; Korean Appln. No. 10-2019-7020499.
Korean Notice of Patent Grant with English translation dated Jan. 4, 2023; Korean Appln. No. 10-2019-7020499.
Extended European Search Report dated Aug. 8, 2023, issued in European Patent Application No. 23173694.3.
Korean Notice of Patent Grant dated Oct. 19, 2023, issued in Korean Patent Application No. 10-2023-7011527.
GPP TR 23.799 V2.0.0; 3rd Generation Partnership Project; Technical Specification Group Services and System Aspects; Study on Architecture for Next Generation System (Release 14), Dec. 1, 2016.

* cited by examiner

APPARATUS AND METHOD FOR CONTROLLING DATA FLOW IN WIRELESS COMMUNICATION SYSTEM

CROSS-REFERENCE TO RELATED APPLICATION(S)

This application is a continuation application of prior application Ser. No. 17/240,114 filed on Apr. 26, 2021; which is a continuation application of prior application Ser. No. 16/468,981 filed on Jun. 12, 2019, which has issued as U.S. Pat. No. 10,993,138 on Apr. 27, 2021; which is a U.S. National Stage application under 35 U.S.C. § 371 of an International application number PCT/KR2017/014583 filed on Dec. 12, 2017; and which is based on and claims priority of a United Kingdom patent application number 1621072.6, filed on Dec. 12, 2016, in the United Kingdom Intellectual Property Office, the disclosure of each of which is incorporated by reference herein in its entirety.

TECHNICAL FIELD

The present disclosure relates to a wireless communication system, and more particularly, relates to apparatus and method for controlling a data flow in wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As a need for data transmission grows rapidly, a plurality of data flows can be configured in a wireless communication network. Therefore, it is required to manage and control the data flows in a wireless communication network.

DISCLOSURE OF INVENTION

Technical Problem

An aspect of the present disclosure is to manage and/or control data flows in wireless communication network.

Solution to Problem

According to the present disclosure there is provided an apparatus and method as set forth in the appended claims. Other features of the invention will be apparent from the dependent claims, and the description which follows.

According to a first aspect of the present disclosure, there is provided a method of managing a QoS flow in a telecommunication system, wherein a QoS flow is a flow of data carried by a Data Radio Bearer, DRB, between a mobile device and a radio network, via one or more network entities, comprising the step of a QoS flow being moved from a first DRB to a second DRB.

In an embodiment, a plurality of QoS flows of a particular mobile device are routed via at least two network entities sequentially, simultaneously or a combination of both. Here, 'sequentially' refers to a handover; 'simultaneously' refers to dual connectivity; and 'a combination of b oth' refers to a handover with dual connectivity.

In an embodiment, only some of a plurality of QoS flows of a particular mobile device are handed from a first network entity to a second network entity.

In an embodiment, the QoS flow is moved individually, not with any other QoS flows carried by the same DRB.

In an embodiment, the QoS flow is moved from a source DRB to a target DRB.

In an embodiment, the QoS flow is moved along with any other QoS flow(s) carried by the same DRB.

In an embodiment, wherein the QoS flow and the any other QoS flow(s) are moved: from source MN or cell to target MN or cell;
between MN or cell and SN or cell;
from MCG bearer type to MCG-split bearer type; or
to conform to LTE+LTE NR In an embodiment, relating to a handover from a source eNB to a target eNB, wherein the handover is either a normal handover wherein the target eNB understands the configuration in the source eNB and continues with that configuration with potential updates, or a full configuration handover wherein the target eNB configures a new Access Stratum configuration.

In an embodiment, QoS flow to DRB mappings are maintained to ensure lossless and in sequence delivery.

In an embodiment, the QoS low to DRB mapping may be altered if lossless and in sequence delivery is not required.

In an embodiment whereby the MCG is LTE and the SCG is NR, the MN is operable to decide whether a QoS flow is offloaded to SCG/SN.

In an embodiment, the MN initiates such a request to the CN.

In an embodiment, for all or part of the QoS flows of a PDU session, part of the traffic may be terminate to the MN and another part to the SN.

In an embodiment, this is possible for all the QoS flows mapped to a particular DRB.

In an embodiment, the MN decides the DRBs to be configured and the QoS flow to DRB mapping.

According to a second aspect of the present disclosure, there is provided a method of managing a QoS flow in a telecommunication network, operating in a Dual Connectivity configuration, such that communication between a User Equipment and a Core Network is performed over a first node and a second node, comprising the step of the core network creating a second backhaul tunnel between itself and the second node, in addition to a first backhaul tunnel between itself and the first node, wherein the first and second backhaul tunnel are for the same PDU session.

According to a third aspect of the present disclosure there is provided a method of forwarding data packets on handover. The method also relates to forwarding of data packets upon change of termination point of a QoS flow in DC.

In an embodiment, tunnels per DRB and tunnels per PDU session are employed, for packets allocated to a DRB and for packets designated for QoS mobility, respectively.

In an embodiment, packets allocated per DRB are provided with PDCP SN in packet header.

In an embodiment, packets allocated for QoS mobility are provide with QoS flow id in packet header.

In an embodiment, the target node configures or requests per QoS flow whether forwarding should be performed.

In an embodiment, an end marker is provided per QoS flow.

Although a few preferred embodiments of the present disclosure have been shown and described, it will be appreciated by those skilled in the art that various changes and modifications might be made without departing from the scope of the invention, as defined in the appended claims.

Advantageous Effects of Invention

According to various embodiments of the present disclosure, data flows in wireless communication network can be efficiently controlled and/or managed.

BRIEF DESCRIPTION OF DRAWINGS

For a better understanding of the invention, and to show how embodiments of the same may be carried into effect, reference will now be made, by way of example only, to the accompanying diagrammatic drawings in which.

BEST MODE FOR CARRYING OUT THE INVENTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for controlling data flows in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
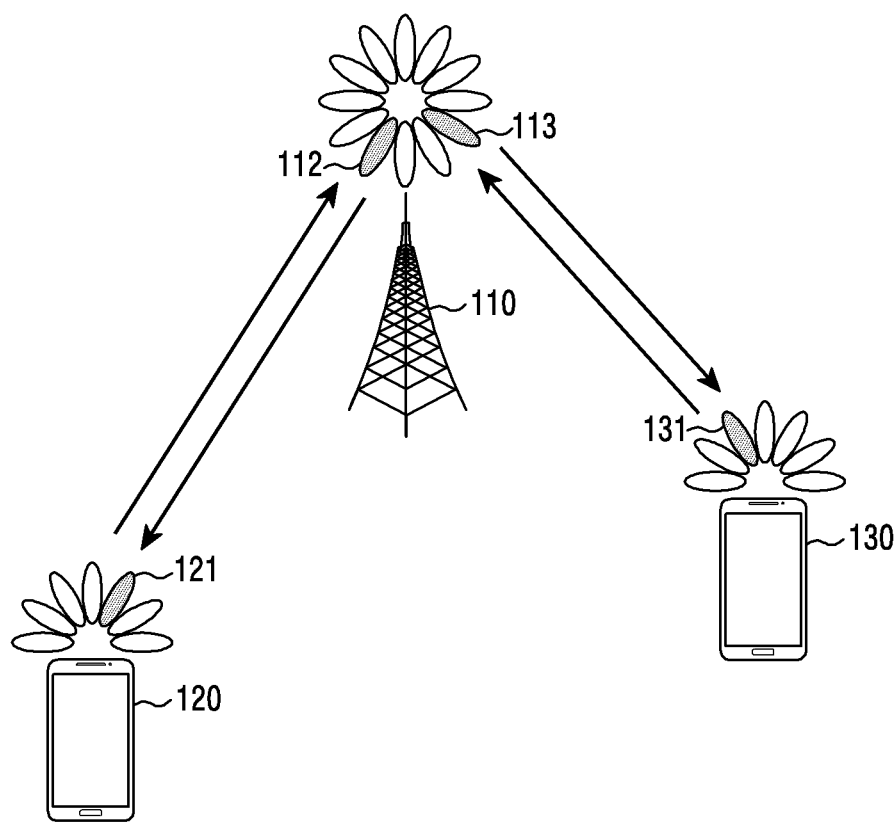
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG.

1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
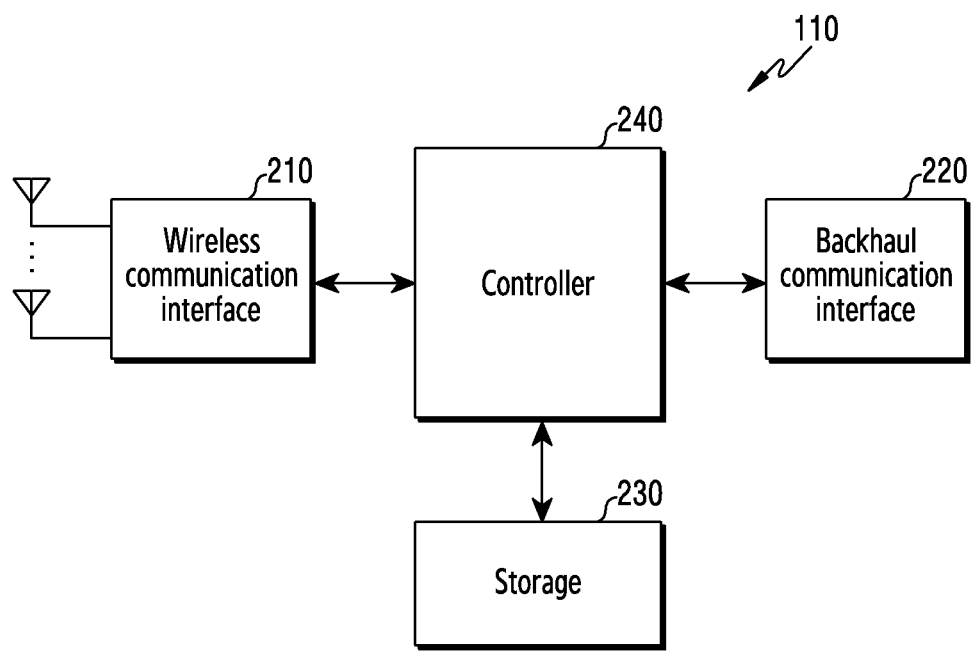
FIG. 2 illustrates a network device in the wireless communication system according to various embodiments of the present disclosure.

FIG. 2 illustrates a network device 200 in the wireless communication system according to various embodiments of the present disclosure. A structure exemplified at FIG. 2 may be understood as a structure of the network device 200, which may comprises at least one of the BS 110, serving gateway (S-GW), mobility management entity (MME), or other network entities included in a core network. According to various embodiments of the present disclosure, the BS 110 may be a master eNB (MeNB), or a secondary eNB (SeNB). The term "-module", "-unit" or "-er" used hereinafter may refer to the unit for processing at least one function or operation and may be implemented in hardware, software, or a combination of hardware and software.

Referring to FIG. 2, the network device may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

According to various embodiments of the present disclosure, the wireless communication interface 210 may be omitted for some network entities. For example, the S-GW, MME, or other network entities in a core network may not comprise the wireless communication interface.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the network device 200. The storage unit 230 may include a volatile memory, a non-volatile memory, or a combination of volatile memory and non-volatile memory. Further, the storage unit 230 provides stored data in response to a request from the controller 240.

The controller 240 controls the general operation of the network device 200. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 may control and/or manage data flows in a wireless communication network. For example, the controller 240 may control the network device 200 to perform operations according to the exemplary embodiments of the present disclosure.

Figure 3:
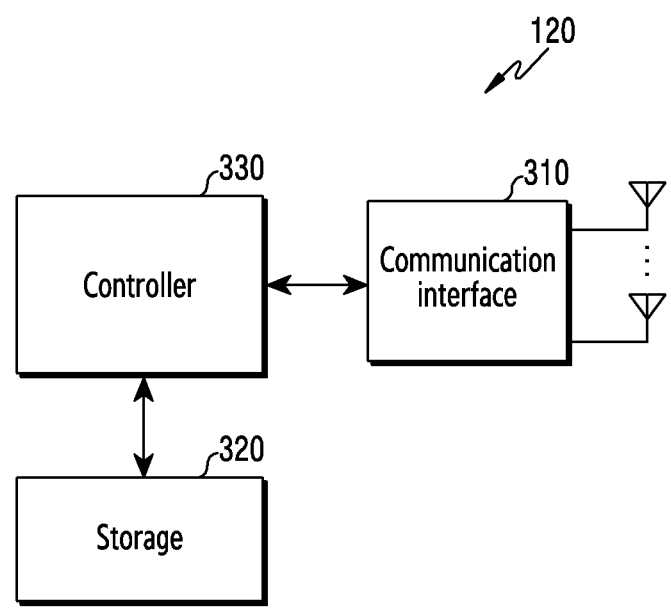
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may perform operations associated with controlling and/or managing of data flows by the network device 200. For example, the controller 330 may control the terminal to perform operations according to the exemplary embodiments of the present disclosure.

Figure 4:
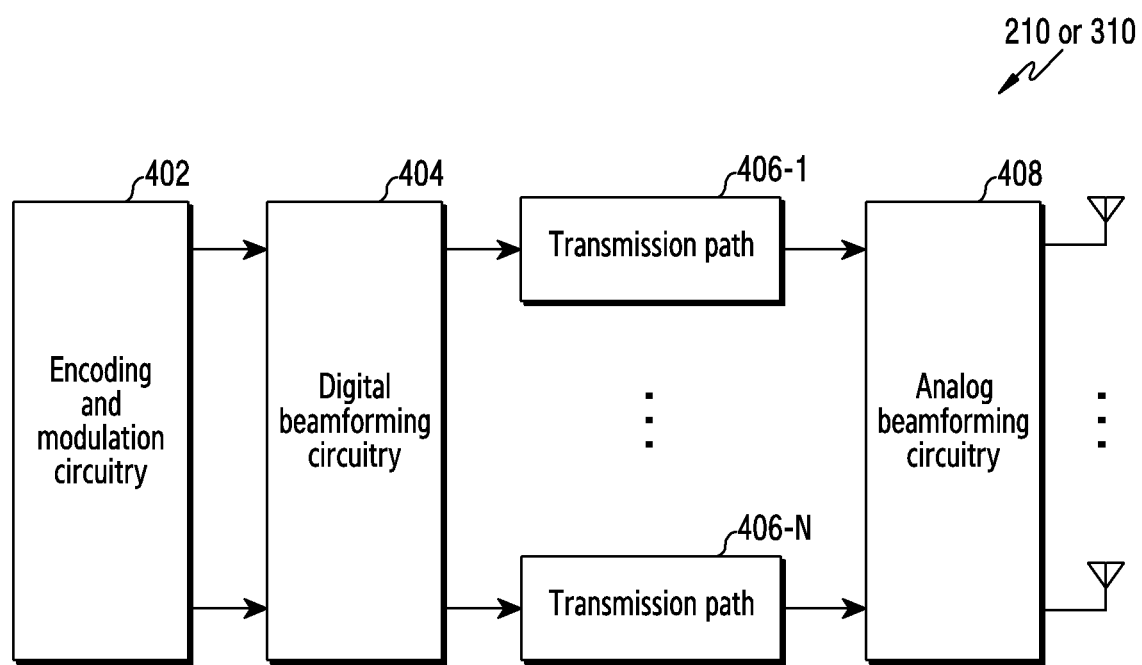
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

In a long term evolution (LTE) system, bearers known as Evolved Packet switched System (EPS) bearers are provided which provide a 1:1 mapping between the User Equipment (UE) or mobile device and the Evolved Packet Core (EPC) at the heart of the network by means of a Data Radio Bearer (DRB). This is illustrated in FIG. 5A which illustrates the 1:1 mapping between EPS bearers and DRBs referred to.

In a new radio (NR) system, the 1:1 mapping has been replaced with a model based on Quality of Service (QoS) flows, which are part of a Protocol Data Unit (PDU) session. The Radio Access Network (RAN) is responsible for managing the mapping of the QoS flows to DRBs, as required. Such a scheme is illustrated in FIG. 5B which shows the notion of QoS flows between the UE and the 5G Core Network, via a NR RAN.

Figure 5A:
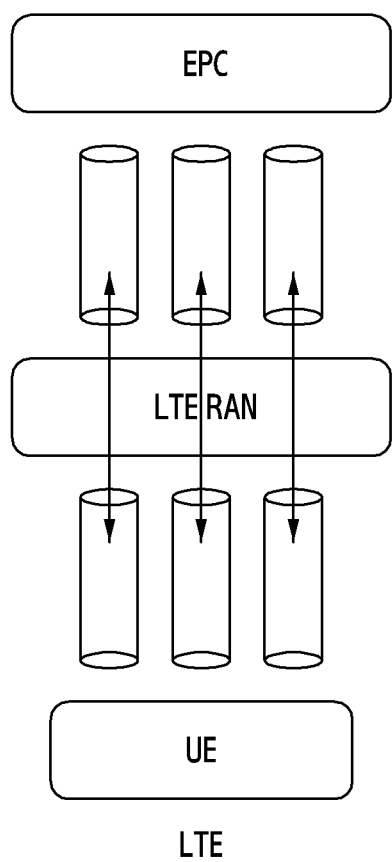
FIGS. 5A and 5B show network configurations with 1:1 bearer mapping, as in case of LTE RAN connected to EPC, and QoS flow based scheme respectively, as in the case of NR RAN connected to 5G CN.
Figure 5B:
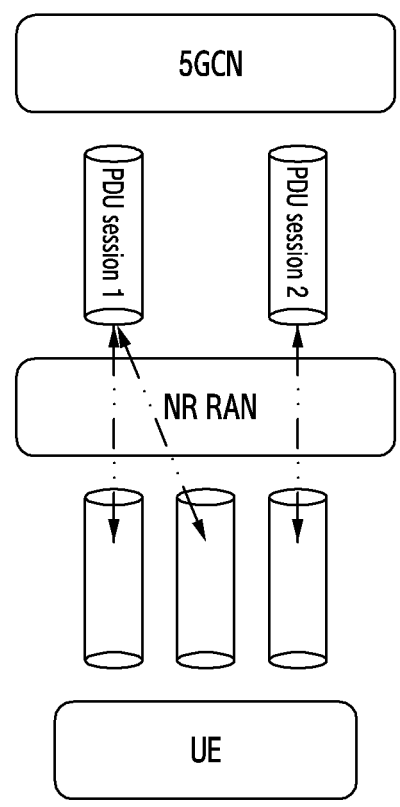
Figure 6:
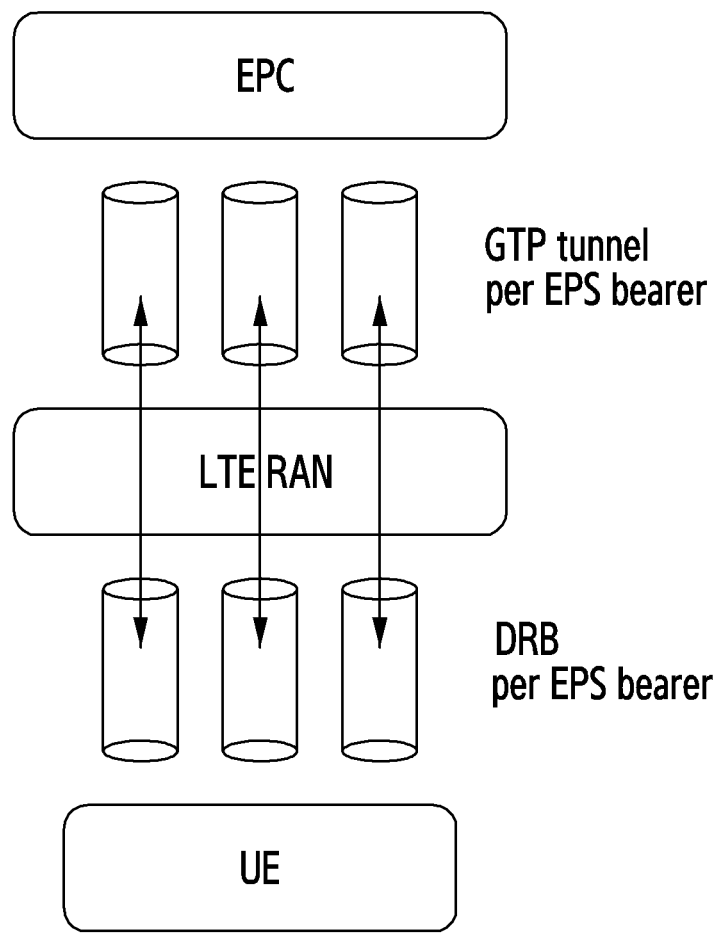
FIG. 6 shows a more detailed view of FIG. 5A.

FIG. 6 shows a slightly more detailed representation of a 4G implementation, similar to that shown in FIG. 5A. Here, there is shown the relationship between the UE, the LTE RAN and the EPC. There is a dedicated DRB per EPS bearer between the UE and the LTE RAB and then a dedicated GTP tunnel per EPS bearer between the LTE RAN and the EPC.

This configuration applies to a non-Dual-Connectivity case.

Figure 7:
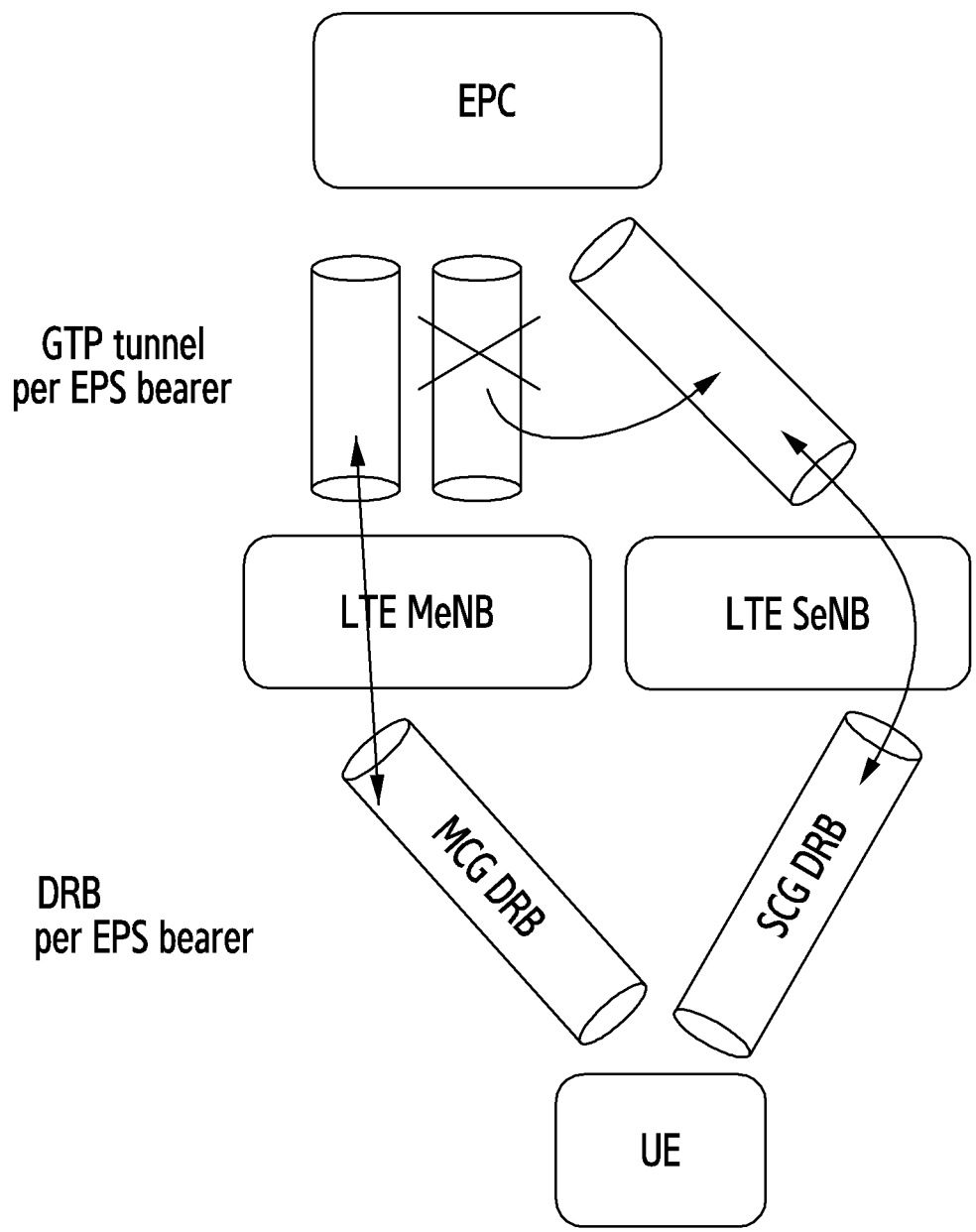
FIG. 7 shows LTE QoS architecture in a dual connectivity (DC) configuration according to an embodiment of the invention.

FIG. 7 shows the configuration according to an embodiment of the invention in the case of a Dual-Connectivity (DC) implementation. In the case of DC, the radio connection between UE and RAN involves multiple cells (i.e. there is a form of carrier aggregation) and some of these cells are controlled by a Master Node (MN or MeNB in case of LTE) while others are controlled by a Secondary Node (SN or SeNB in case of LTE). The cells controlled by MN are referred to as the Master Cell Group (MCG) while the cells controlled by an SN are referred to as an Secondary Cell Group (SCG).

In this case, the UE is in communication with an LTE MeNB and an LTE SeNB, in each case via a DRB per EPS bearer. In this case, data traffic moves between the MeNB and the SeNB. When an EPS bearer is moved from the MeNB to the SeNB, as shown, the MeNB requests from the Mobility Management Entity (MME), a different IP address/ DL GTP Tunnel Endpoint Identifier (TEID). The EPC is not aware that this IP address/DL GTP TEID corresponds to a different eNB. Further, one eNB can use different IP addresses.

Figure 8:
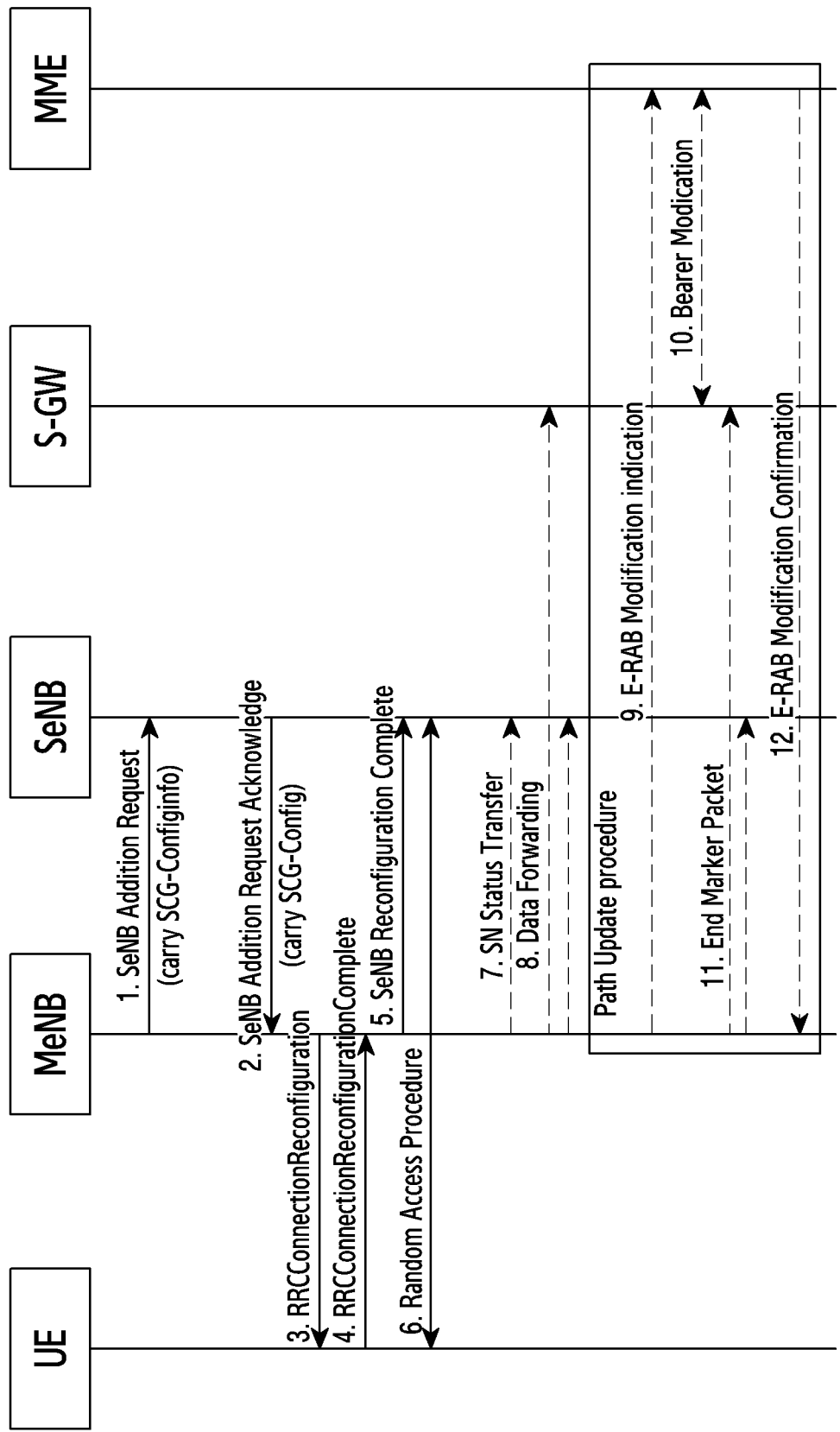
FIG. 8 shows a signalling diagram illustrating the message sequence for the case where a first SCG cell is configured to the UE i.e. a procedure referred to as SCG establishment or SN addition according to an embodiment of the invention.

FIG. 8 illustrates the signal flow between UE, MeNB, SeNB, S-GW and MME. This is known from prior art LTE DC operation, but is included for context.

Figure 9:
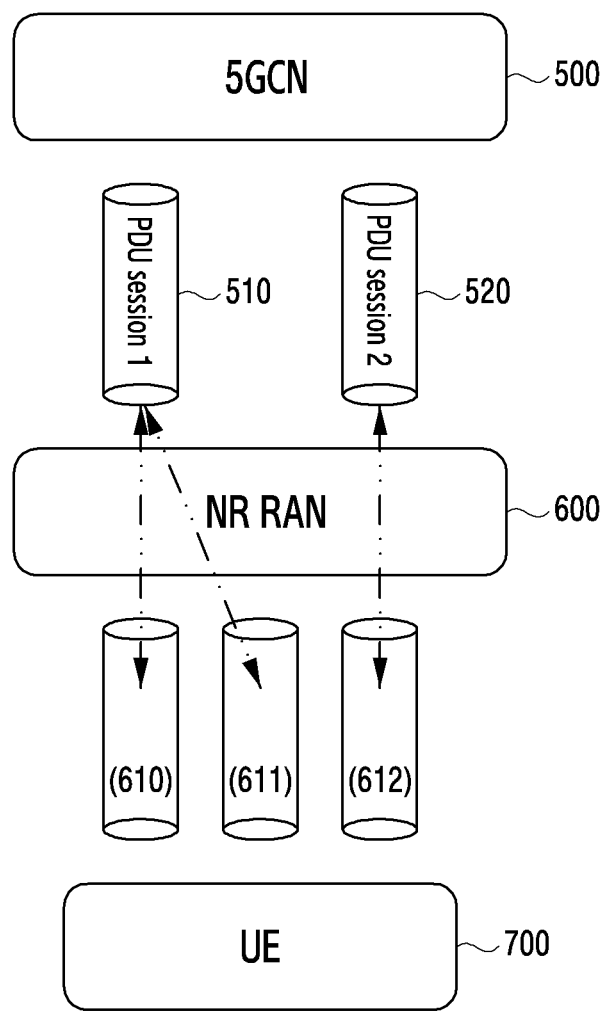
FIG. 9 shows NR QoS architecture in a non-DC configuration according to an embodiment of the invention.

FIG. 9 shows a non-DC case in 5G. Here, there is shown a GTP tunnel per PDU session 510, 520 between the NR RAN 600 and the 5GCN 500. Each PDU session 510, 520 handles multiple QoS flows, shown by the dotted/dashed lines. Between the NR RAN 600 and the UE 700, there are DRBs 610, 611, 612 handling a number of QoS flows of one PDU session.

It shows that the QoS flows from a PDU session1 510 are mapped by RAN to two DRBs, 610 and 611.

Embodiments of the invention, in particular, concern the handling of QoS flows upon change of MN (handover), as well as upon addition or change of SN i.e. involving a change of the involved network nodes, which can also be regarded as mobility cases. Some of these aspects however equally apply in non-mobility cases e.g. in case of changes regarding the offloading in case of DC.

For these cases, attention is given to the mapping of QoS flows to DRBs, which is a function controlled by the RAN nodes (MN and SN). In particular, different cases—which are referred to as level 1 and level 2 mobility in the following—are distinguished. It should be noted that these mobility levels concern the QoS flow to DRB mapping. i.e. a QoS flow mobility level may occur not involving any actual UE mobility or change of the network node(s) controlling the UEs radio connection.

In this case, the RAN 600 maps different QoS flows of a certain PDU session to one or more DRBs. In an embodiment, the RAN maps similar flows together on a DRB. Similar flows in this context can mean data flows having similar QoS requirements e.g. similar latency requirements, for instance. Other means of grouping can be implemented as required.

For each UE, 5GCN 500 establishes one or more PDU sessions and for each UE, the RAN 600 establishes one or more DRBs per PDU session. The RAN 600 maps packets belonging to different PDU sessions to different DRBs. Hence the RAN 600 establishes at least one default DRB for each PDU session. Non-Access Stratum (NAS) level packet filters in the UE and the 5GCN associate UL and DL packets with QoS flows. AS-level mapping rules in the UE and the RAN associate UL and DL QoS flows with DRBs.

At NAS level, the QoS flow is the finest granularity of QoS differentiation in a PDU session. A QoS flow is identified within a PDU session by a QoS Flow ID (QFI) carried in an encapsulation header over NG-U.

RAN and 5GC ensure quality of service (e.g. reliability and target delay) by mapping packets to appropriate QoS Flows and DRBs. Hence there is a 2-step mapping of IP-flows to QoS flows (NAS) and from QoS flows to DRBs (Access Stratum).

At NAS level, a QoS flow is characterised by a QoS profile provided by 5GC to RAN and QoS rule(s) provided by 5GC to the UE. The QoS profile is used by RAN to determine the treatment on the radio interface while the QoS rules dictates the mapping between uplink User Plane traffic and QoS flows to the UE. A QoS flow may either be Guaranteed Bitrate (GBR) or "Non-GBR" depending on its profile. The QoS profile of a QoS flow contains QoS parameters, for instance:

For each QoS flow:
A 5G QoS Identifier (5QI); and.
An Allocation and Retention Priority (ARP).
In case of a GBR QoS flow only:
Guaranteed Flow Bit Rate (GFBR) for both uplink and downlink;
Maximum Flow Bit Rate (MFBR) for both uplink and downlink.
In case of Non-GBR QoS only:
Reflective QoS Attribute (RQA): the RQA, when included, indicates that some (not necessarily all) traffic carried on this QoS flow is subject to reflective quality of service (RQoS) at NAS.

At Access Stratum level, the data radio bearer (DRB) defines the packet treatment on the radio interface (Uu). A DRB serves packets with the same packet forwarding treatment. Separate DRBs may be established for QoS flows requiring different packet forwarding treatment. In the downlink, the RAN maps QoS Flows to DRBs based on NG-U marking (QFI) and the associated QoS profiles. In the uplink, the UE marks uplink packets over Uu with the QFI for the purposes of marking forwarded packets to the CN.

In the uplink, the RAN may control the mapping of QoS Flows to DRB in two different ways:

Reflective mapping: for each DRB, the UE monitors the QFI(s) of the downlink packets and applies the same mapping in the uplink; that is, for a DRB, the UE maps the uplink packets belonging to the QoS flows(s) corresponding to the QFI(s) and PDU Session observed in the downlink packets for that DRB. To enable this reflective mapping, the RAN marks downlink packets over Uu with QFI.

Explicit Configuration: besides the reflective mapping, the RAN may configure by RRC an uplink "QoS Flow to DRB mapping".

The UE shall always apply the latest update of the mapping rules regardless of whether it is performed via reflective mapping or explicit configuration.

For each PDU session, a default DRB is configured. If an incoming UL packet matches neither an RRC configured nor a reflective "QoS Flow ID to DRB mapping", the UE shall map that packet to the default DRB of the PDU session.

Within each PDU session, it is up to NG-RAN how to map multiple QoS flows to a DRB. The RAN may map a GBR flow and a non-GBR flow, or more than one GBR flow to the same DRB. The timing of establishing non-default DRB(s) between RAN and UE for QoS flow configured during establishing a PDU session can be different from the time when the PDU session is established. It is up to RAN when non-default DRBs are established.

In DC, the QoS flows belonging to the same PDU session can be mapped to different bearer types and as a result there can be two different SDAP entities configured for the same PDU session: one for MCG and another one for SCG (for instance when one MCG bearer and one SCG bearer are used for two different QoS flows).

In embodiments of the invention, QoS flow mobility is used to describe any mobility of a QoS flow, such as moving a QoS flow to another DRB and/or DRB type and/or another eNB.

There are various alternatives to manage such QoS flow mobility. In a first alternative, QoS flow mobility may only be achieved at one level i.e. individual QoS flow mobility level i.e. a QoS flow can only be moved from one DRB to another DRB.

Figure 10:
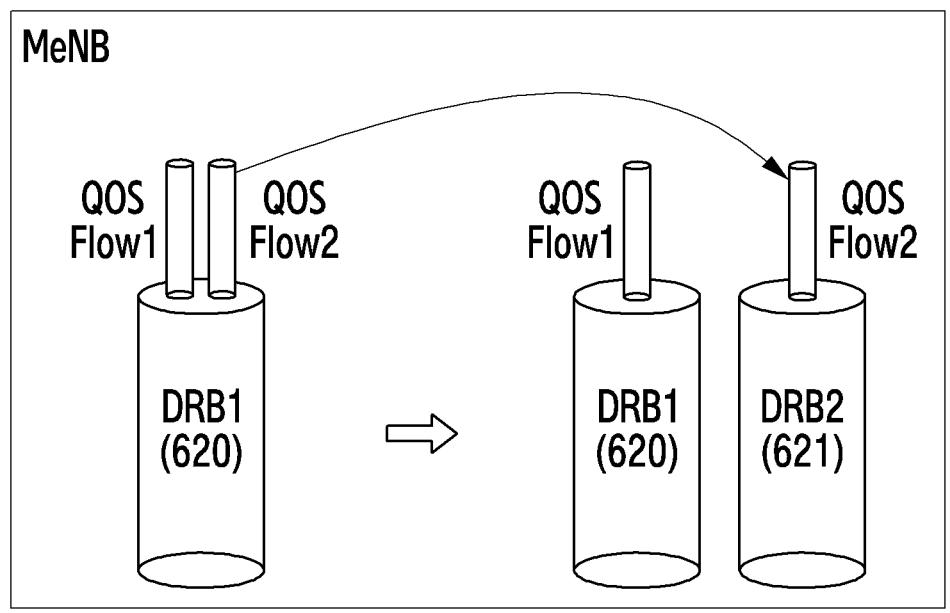
FIG. 10 shows a representation of Level 1 mobility (i.e. a case involving, for a given DRB, a change QoS flows to DRB mapping) according to an embodiment of the invention.

This is illustrated in FIG. 10, where a DRB1 620 handles two QoS flows. QoS flow2 can be moved to a new DRB2 621, while QoS flow1 is retained on DRB1 620. Individual QoS flows are moved i.e. their mapping is updated from a source DRB to a target DRB. The source and target DRB may be of any type, such as MCG, SCG, split or can belong to different eNBs.

The source DRB may be released at the same time as the QoS flow moves, if no other QoS flows are remaining on the DRB, and the target DRB may be established at the same time as the QoS flow moves, if no other QoS flows are already using the target DRB.

In this particular example, DRBs are not moved and the type of bearer does not change. In other words, bearers are established (with a certain type) and released and have QoS flows mapped to them.

In a second alternative, QoS flow mobility can be achieved at two levels:
  a DRB may be moved from one DRB type or eNB to another DRB type or eNB (Level 1)
  a QoSflow can be moved from one DRB to another DRB as described in the first alternative above (Level 2).

Figure 11:
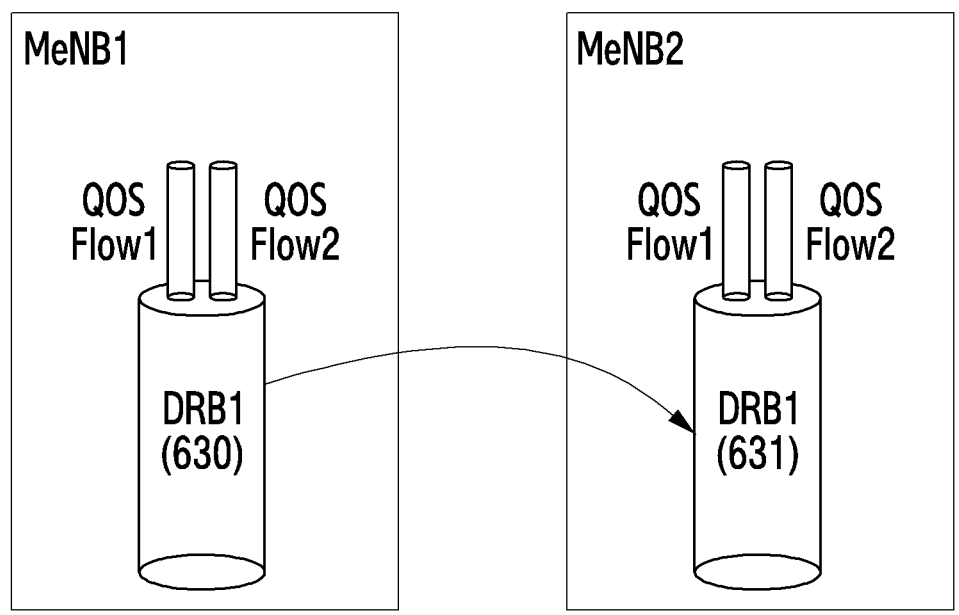
FIG. 11 shows a representation of Level 2 mobility according to an embodiment of the invention.

This is illustrated in FIG. 11, which shows QoS flow1 and QoS flow2 on DRB1 630 on MeNB1 moving to DRB1 631 on a new MeNB (MeNB2). This is a case involving no change in mapping between QoS flows and DRB. This is shown for the case of handover (i.e. radio connection involves changing a first to a second MeNB).

In level 1, DRBs can be moved. For instance, a DRB can be moved from an MeNB to an SeNB (MCG→SCG bearer type change) or any other bearer type change. Alternatively, a DRB can be moved from one MeNB to another MeNB (e.g. at handover) as shown in FIG. 11.

Additionally, individual QoS flows can be moved from a source DRB to a target DRB (Level 2).

In practice, the second mentioned alternative, above, is preferred. This approach includes DRB mobility at Level 1 and QoS flow mobility at Level 2.

The table 1 below shows certain features of this approach and assists in fully understanding the features.

TABLE 1

| | Level 1 - DRB Mobility | Level 2 - Individual QOS flow mobility |
|---|---|---|
| 1. What is moved? | DRB and all QoS flows mapped to that DRB | One individual QoS flow |
| 2. From where to where? | Moved from source MeNB/cell to target MeNB/cell (handover) Moved between MeNB/cell and SeNB/cell (MCG <–> SCG bearer type change) Reconfigured from/to MCG bearer type to/from MCG-split bearer type Conform to LTE + LTE NR | Moved from source DRB to target DRB |
| 3. Lossless? | Yes | No |
| 4. Signalling to the UE | RRC e.g. at handover (i.e. no reflective QoS) | UP (reflective QoS (FFS)) and RRC |
| 5. Signalling to 5G-CN | Control plane Concerns groups 1 . . . n QOS flows | Control plane and/or user plane Concerns 1 individual QOS flow |

In LTE systems, two different handover types are supported:
 1) Normal—Target eNB understands the configuration of the source eNB and continues with that configuration with potential updates.
 2) Full configuration handover—Target eNB does not fully understand the Access Stratum (AS) configuration in the source eNB. Target eNB configures a complete new Access Stratum Configuration In NR systems, these two prior art handover types are also assumed to be supported.

Figure 12:
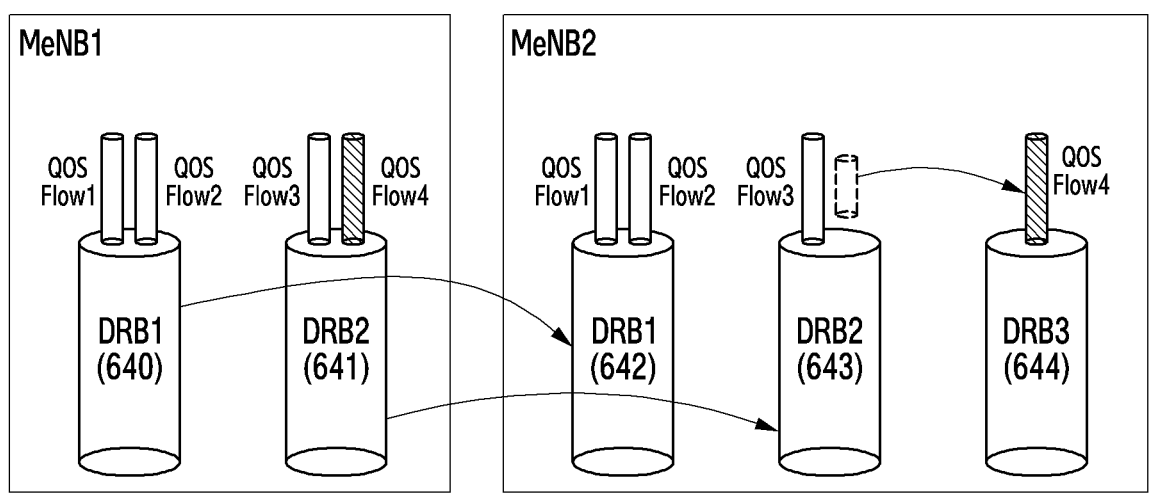
FIG. 12 shows a representation of handover in a combination of Level 1 and Level 2 mobility shown for the case of handover, according to an embodiment of the invention.

According to an embodiment of the invention, a normal handover may involve a combination of Level 1 and Level 2 QoS flow mobility as described previously. This is illustrated in FIG. 12. Here, on MeNB1, DRB1 630 carries QoS flow 1 and QoS flow2 and DRB2 641 carries QoS flow3 and QoS flow 4. At handover to MeNB2, DRB1 640 is moved to DRB1 642, carrying QoS flow 1 and QoS flow2. DRB2 641 is moved to DRB2 643, carrying QoS flow 3 and QoS flow 4. Then QoS low 4 is moved to DRB3 644. The original two DRBs on MeNB1 have been moved to 3 DRBs on MeNB2.

Figure 13:
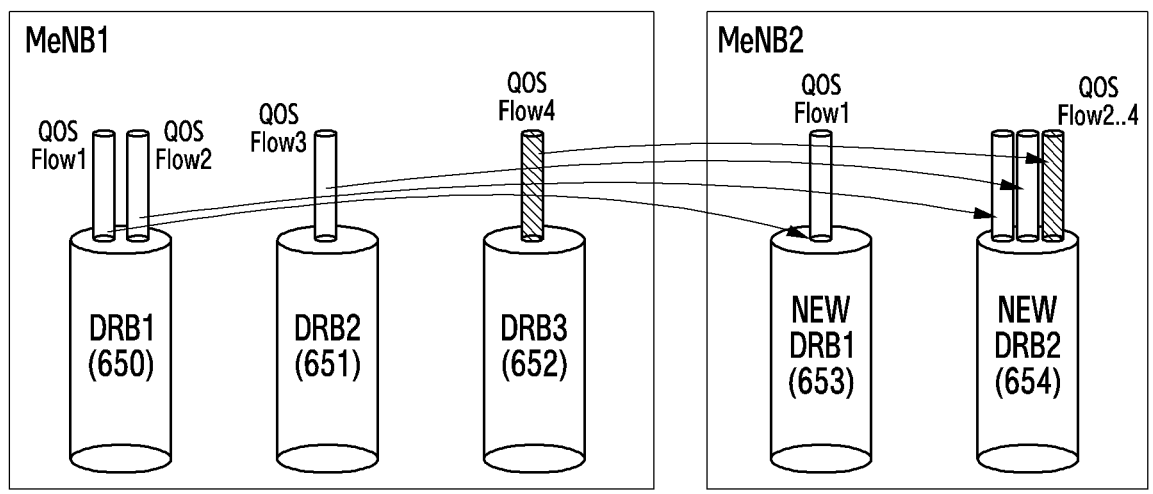
FIG. 13 shows a representation of handover in Level 1 mobility (I.e. there is no DRB for which the QoS flow to DRB mapping remains un-changed) according to an embodiment of the invention.

According to another embodiment of the invention, a full configuration handover is shown in FIG. 13. In this type of handover, the full AS configuration is released. As a result, all DRBs, as well as the QoS flow→DRB mapping is released. As such, DRBs in the target eNB are new DRBs, (i.e. not continued, no PDCP re-establishment). As a result, the target eNB indicates how to map the different QoS flows to the new DRBs based on level 1 QoS mobility flow only.

In FIG. 13, there is shown MeNB1 with DRB 650, DRB2 651 and DRB3 652. DRB1 650 carried QoS flow1 and QoS flow2; DRB2 651 carries QoS flow3; and DRB3 652 carries QoS flow4. At handover to MeNB2, New DRB1 653 carries QoS flow1 and New DRB2 654 carries QoS flow2, QoS flow3 and QoS flow4.

During handover, it is necessary to consider the issue of Xn forwarding. In particular, it is useful to consider if it would it make sense to have all data forwarding in DRB specific GTP tunnels at handover as in prior art LTE systems.
 a) Packets that are already assigned a PDCP SN and for which a retransmission may be required in target eNB, are forwarded with a drb-id marking (e.g. drb id or drb specific tunnel), or at least an identity with which the target eNB can derive the drb-id.
This only if the concerned DRB is continued in the target eNB
 b) For DL packets that have not been transmitted yet, it is sufficient to forward them with QoS flow id (i.e. no DRB specific marking/tunneling): the target eNB can perform mapping to DRB.

FORMAT 1: GTP header (identifying PDU session), QOS flow id, PDCP SN, IP packet

For packets for which transmission has not been attempted in the source, forwarded PDU will contain:

FORMAT 2: GTP header (identifying PDU session), QOS flow id, IP packet

In LTE, the target eNB can configure, per-DRB, whether packets should be forwarded or not. In NR this type of configuration may be performed per QOS flow.

However, if a DRB with RLC-AM is continued, since it is not desirable to have holes in the PDCP SN, the concerning DL packets should be forwarded anyway.

As a result, the following forwarding behaviour for a normal (non-full-configuration) handover will apply as a table 2:

TABLE 2

| | Packets already transmitted in source | DRB continued? | QOS flow forwarding requested | Forwarded packets | Comment |
|---|---|---|---|---|---|
| 1 | Y | Y | Does not matter | FORMAT 1 | Note concerns all QOS flows mapped to this DRB in the source eNB i.e. this may concern packets of QOS flows mapped to other DRB's in target eNB, or packets of QOS flows that are not continued in target eNB |
| 2 | Y | N | Does not matter | No forwarding | FORMAT 1 not applicable in this case |
| 3 | N | Does not matter | Y | FORMAT 2 | |
| 4 | N | Does not matter | N | No forwarding | |

Note that if per-DRB tunnelling/forwarding is active, it is possible that packets of type b), above, would be forwarded in a tunnel for DRB1, but actually the target eNB quickly remaps this QoS flow and the end result is that they are handled on a different DRB2.

Also considering that embodiments will have a tunnel per PDU session, it is possible to also have per-PDU session tunnels on Xn at handover.

The following approach is followed for all handover options described herein:

On Xn at handover there is a tunnel per PDU session

For packets for which transmission has been attempted in the source, if the concerned DRB is continued at the target eNB, forwarded PDU will contain:

In the case of a full configuration handover, the following forwarding behaviour applies as a table 3:

TABLE 3

| | Packets already transmitted in source | QOS flow forwarding requested | Forwarded packets |
|---|---|---|---|
| 1 | Y | Does not matter | No forwarding |
| 3 | N | Y | FORMAT 2 |
| 4 | N | N | No forwarding |

The following table 4 illustrates three different handover examples, focusing on QoS flows. Examples 1 and 2 relate to normal handover, while example 3 is a full configuration handover.

TABLE 4

| | Source config | Target config | Forwarding requested for QOS flows | Forwarding behaviour | Notes |
|---|---|---|---|---|---|
| 1. | DRB1: QOS flows 1, 2 | DRB1: QOS flows 1, 2, 3 | 1, 2, 3, 4, 5, 6 | DRB1: Outstanding packets with | QOS flow 1, 2, 4: Forwarding and continuation on same radio bearer (loss/insequence) |

TABLE 4-continued

| | Source config | Target config | Forwarding requested for QOS flows | Forwarding behaviour | Notes |
|---|---|---|---|---|---|
| | DRB2: QOS flows 3, 4 DRB3: QOS flows 5, 6 | DRB2: QOS flows 4, 5 | | FORMAT1 DRB2: Outstanding packets with FORMAT1 QOS Flow 1, 2, 3, 4, 5, 6: Non-txed packets with FORMAT2 | QOS flow 3: Retransmission from source in target will still occur on DRB2; New tx on DRB1. Lossless, but might have some out of sequence delivery during handover. QOS flow 5: Potential packet loss due to release of DRB3 (no retx of outstanding packets in source eNB). New tx on DRB2 QOS flow 6: Released. Also no retransmissions of outstanding packets in source due to DRB3 release. |
| 2 | DRB1: QOS flows 1, 2 DRB2: QOS flows 3, 4 | DRB1: QOS flows 1, 2 DRB2: QOS flows 3 | 1, 3 | DRB1: Outstanding packets with FORMAT1 DRB2: Outstanding packets with FORMAT1 QOS Flow 1, 3: Non-txed packets with FORMAT2 | QOS flow 1, 3: Forwarding and continuation on same radio bearer (loss/insequence) QOS flow 2: Continues on DRB2 but some loss may occur due to no forwarding QOS flow 4: Discontinued, but since DRB2 is continued in target eNB, still some retransmission of outstanding packets in source eNB of QOS flow 4 may happen in target eNB on DRB2 |
| 3. | DRB1: QOS flows 1, 2 DRB2: QOS flows 3, 4 | New DRB1: QOS flows 1, 2 New DRB2: QOS flows 3, 4 | 1, 2 | QOS Flow 1, 2: Non-txed packets with FORMAT2 | |

In LTE, there is one end-marker-packet per DRB from the CN. In NR, since the CN is not aware of QOS-flow→DRB mapping, there is one end-marker-packet per QOS flow. This results in slightly updated target-eNB behaviour in NR i.e. when an end-marker-packet for a certain QOS flow is received by the target eNB, this does not mean that all traffic received from the CN for that DRB can be transmitted. i.e. only DL traffic belonging to that QOS flow can be transmitted.

Figure 14:
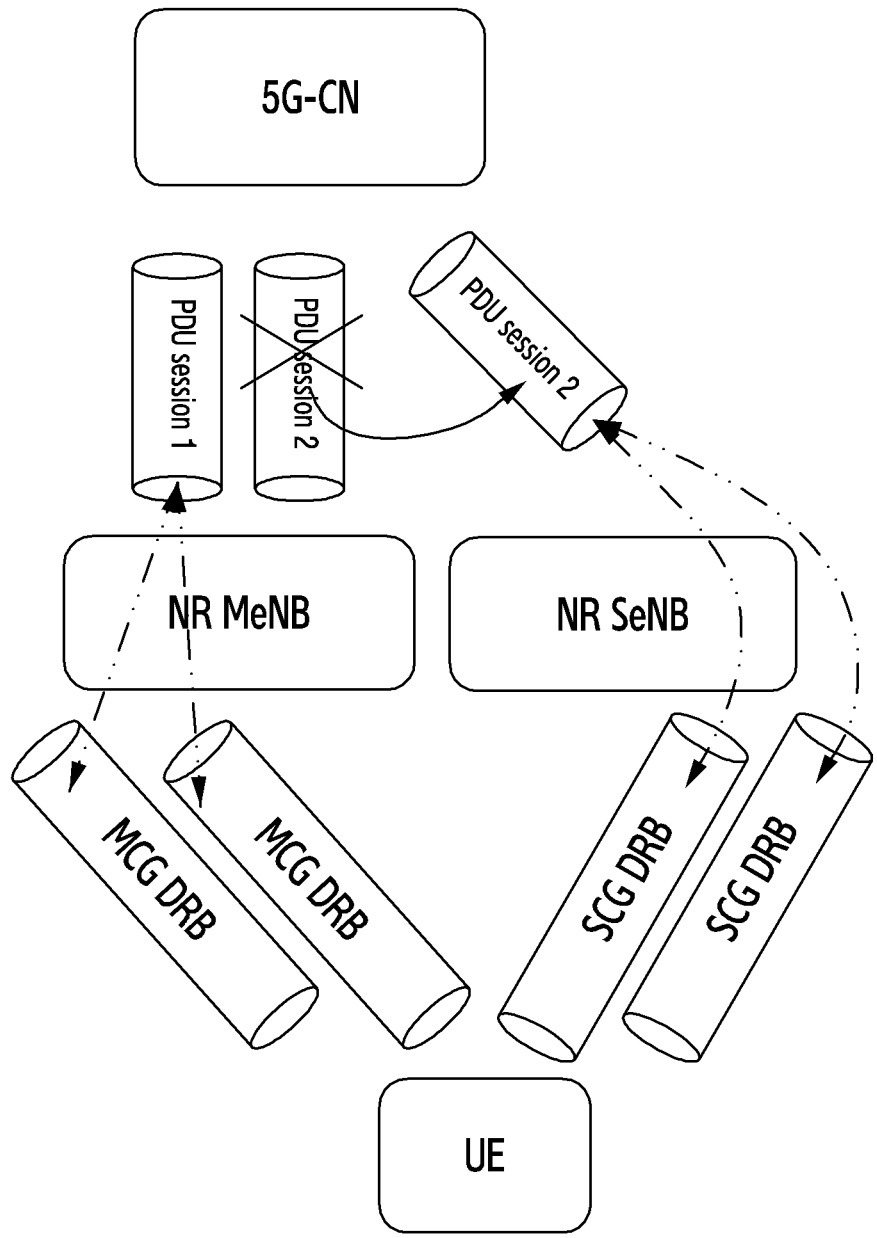
FIG. 14 shows NR QoS architecture with 1 tunnel per PDU session, where all QoS flows of PDU sessions 2 are offloaded/moved to an SN, according to an embodiment of the invention.

FIG. 14 illustrates an example configuration where the MeNB decides to move one complete PDU session to the SeNB. As such, it moves one tunnel endpoint in a manner similar to that described in relation to FIG. 7. This is functionally similar to (or the same as) moving all EPS bearers of one PDU connection from MeNB to SeNB in EPC.

However, this approach has certain disadvantages in that it does not allow the MeNB to move only some QoS flows to the SeNB. For instance, assume that a PDU session is handling a voice call and best effort data. The MeNB might wish to move the best effort data to the SeNB while keeping the voice call on the MeNB. This would not be possible with this approach. In practice, this approach may have limited utility.

Figure 15:
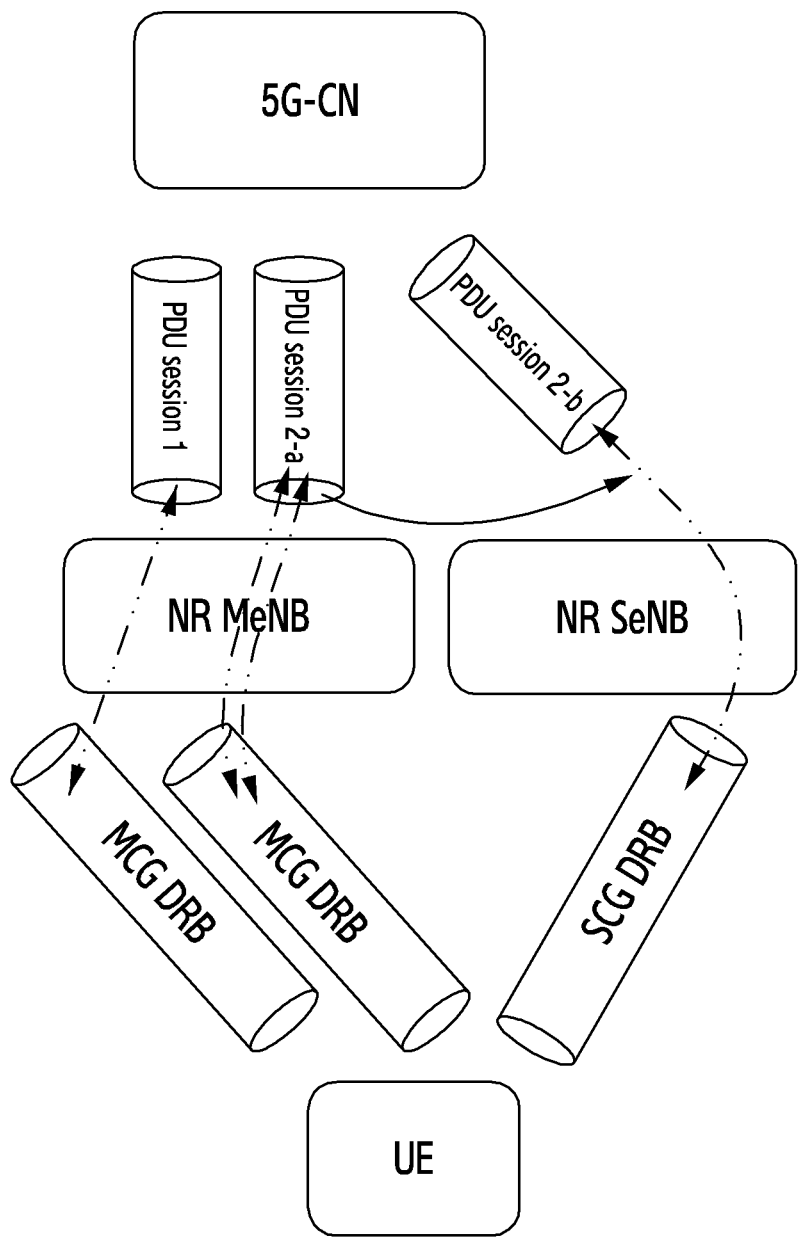
FIG. 15 shows NR QoS architecture with multiple tunnels per PDU session according to an embodiment of the invention.

FIG. 15 shows an alternative configuration according to an embodiment of the invention. Here, the MeNB requests the 5G-CN to establish a second backhaul tunnel for the same PDU session. Here, only part of the QoS flows of a PDU session are offloaded to/terminated at an SN. i.e. the CN splits the traffic associated with a PDU session using a separate tunnel to each involved RAN node.

This is illustrated by PDU session 2-a and PDU session 2-b. This second tunnel has a different IP address/TEID, corresponding to the SeNB. The other PDU session 2-a is routed via the MeNB still. In this way, two parallel tunnels are established for one PDU session.

Next, the MeNB asks the 5G-CN to move certain QoS flows from tunnel 2-a to tunnel 2-b. In this case, i.e. RAN connected to 5G-CN, the smallest level of granularity known to the RAN is the QoS flow. The signalling required to manage and coordinate this process could be in the Control Plane or in the User Plane.

Unlike the previous embodiment of FIG. 14, the embodiment of FIG. 15 represents a more practical solution in most circumstances.

It is assumed that NR DC architecture is applicable for cases of RAN DC connected to 5G-CN. This is as shown in FIG. 15. The new QoS architecture is applicable to the following DC cases: MeNB NR+SeNB NR; MeNB eLTE+SeNB NR; MeNB NR+SeNB eLTE; and MeNB eLTE+SeNB eLTE.

If the RAN is connected to the EPC, the legacy LTE DC architecture is assumed to be applicable. This is as shown in FIG. 7. The types of DC which legacy QoS architecture are applicable are: MeNB LTE+SeNB LTE; and MeNB LTE+SeNB NR.

According to the previous description, it is possible to split a PDU session at the CN level, it is reasonable to consider if it is still useful to support split bearers in the NR+NR DC case.

Figure 16:
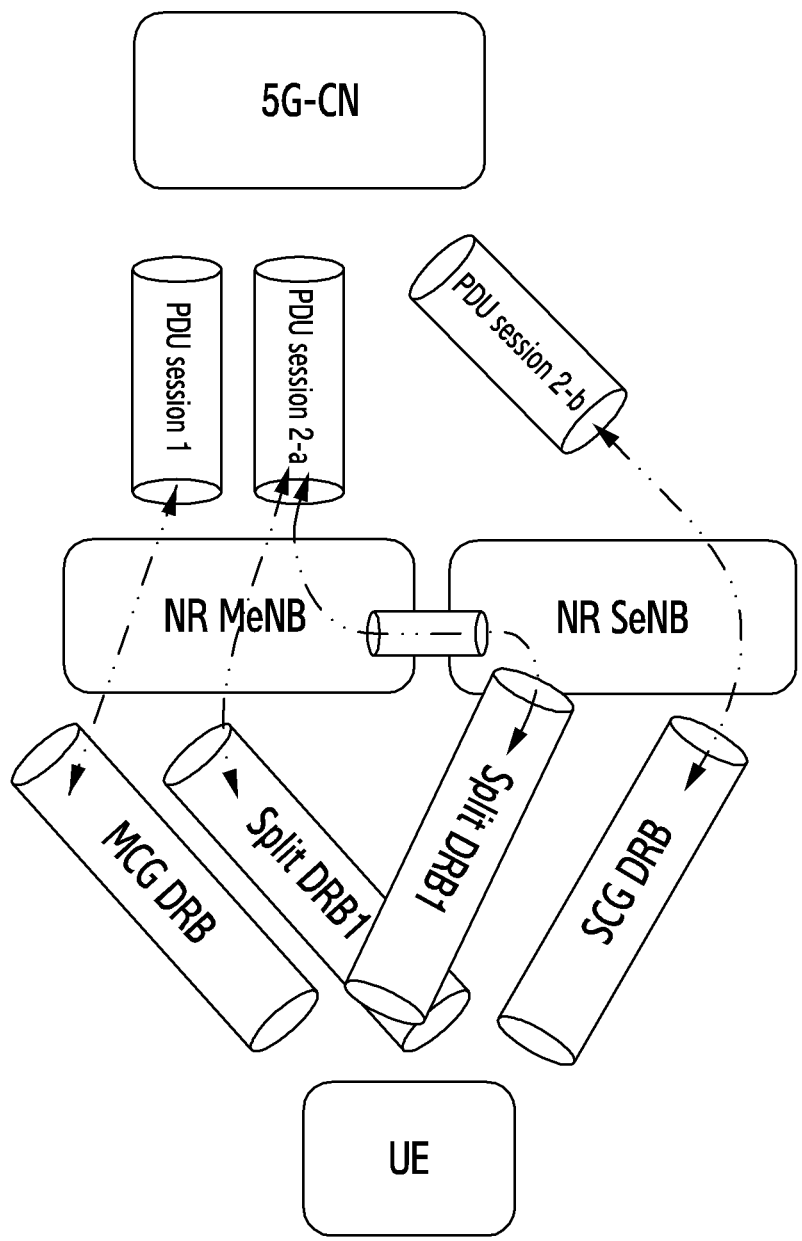
FIG. 16 shows NR QoS architecture with split bearers according to an embodiment of the invention.

This is illustrated in FIG. 16, which shows NR+NR DC, with a split DRB as indicated by the connection between the MeNB and SeNB. Here, a RAN node splits the traffic carried by a DRB between MCG and SCG. iI.e. some packets use the MCG leg while others are carried by the SCG leg. Furthermore, the traffic of a QoS flow is carried across both legs i.e. the RAN split may be QoS flow agnostic. The FIG. also shows that some QoS flows may be mapped to a DRB only using the MCG or SCG leg.

It transpires that split bearers are still useful because PDU session splitting at the 5G-CN level as described does not allow lossless move of QoS from MeNB to SeNB, since there is no common SN. Further, it does not allow aggregation of MeNB+SeNB resources for one QoS flow. As such, split bearers are useful and can still play a valuable role in network planning and configuration.

Previously, Xn forwarding at handover has been described using PDU session tunnels with the following PDU formats:

FORMAT 1: GTP header (identifying PDU session), QOS flow id, PDCP SN, IP packet

FORMAT 2: GTP header (identifying PDU session), QOS flow id, IP packet

There are two options for handling the transport of the split bearer in NR+NR DC:

Option 1: PDU session tunnelling

Also have per-PDU session tunnelling for this case, and define a 3rd format:

FORMAT 3:

GTP header (identifying PDU session), DRB-ID, PDCP SN, Compressed/Ciphered IP packet QOS flow not so needed in DL (mapping to DRB already done)

QOS flow not available in UL (PDCP and higher layers in MeNB)

Option 2: DRB level tunnelling

Alternatively, provide DRB specific tunnels (like in LTE) only for this split bearer case:

Since packets below PDCP are involved, the PDCP PDUs forwarded between eNBs are primarily part of a bearer. Accordingly it may be possible to have tunnels per-DRB as in LTE.

An issue that arises in embodiments of the invention is to do with responsibility for managing DRB/QoS flow. In LTE, there is one DRB per EPS bearer/E-RAB. The MeNB is responsible for DRB type determination, DRB establishment and DRB release. In other words, the MeNB decides which DRBs are to be established whether they are of type MCG, SCG or split. In the case of SCG or split, the MeNB asks the SeNB to support establishment of the required DRBs. In this case, the SeNB performs Call Admission Control (CAC). If the SeNB accepts, it provides the detailed radio configuration for the SCG (RLC and lower) to SeNB, which the MeNB transmits to the UE.

In NR systems, however, the RAN has more flexibility and/or responsibility with respect to DRB creation. In NR, the RAN can decide whether to multiplex or not flows of the same PDU session on one DRB. Decisions of this sort are decided by a new layer, known as Access Stratum Mapping layer (ASML)

ASML can be configured as a separate protocol layer or, alternatively, can be set up as a sub-layer part of PDCP.

In the case of LTE+LTE DC, the MeNB is responsible for DRB management (i.e. setup and release) of DRBs. The same approach is adopted in enabling DRB mobility, such as moving a bearer from MCG to SCG type.

In the case of NR+NR DC, the MeNB is responsible for management (setup/type change/release) of all DRBs to the UE i.e. MCG, MCG-split and SCG bearers.

It is assumed that it is not generally desirable to allow the ASML layer in the SeNB to be autonomously responsible for mapping QoS flows to DRBs. In order to ensure that QoS flows can be handled without loss when moved between SeNB and MeNB, it is important to have the same QoS flow→DRB mapping in both MeNB and SeNB i.e. in such a case, a DRB move rather than an individual QoS flow move can be executed.

If two different entities start to independently determine the QoS flow→DRB mapping, then the possibilities for lossless mobility will decrease.

It should be noted that in NR+NR DC, the MeNB control the QoS flow→DRB mapping in both the MeNB and SeNB i.e. for mapping to any DRB type.

Figure 17:
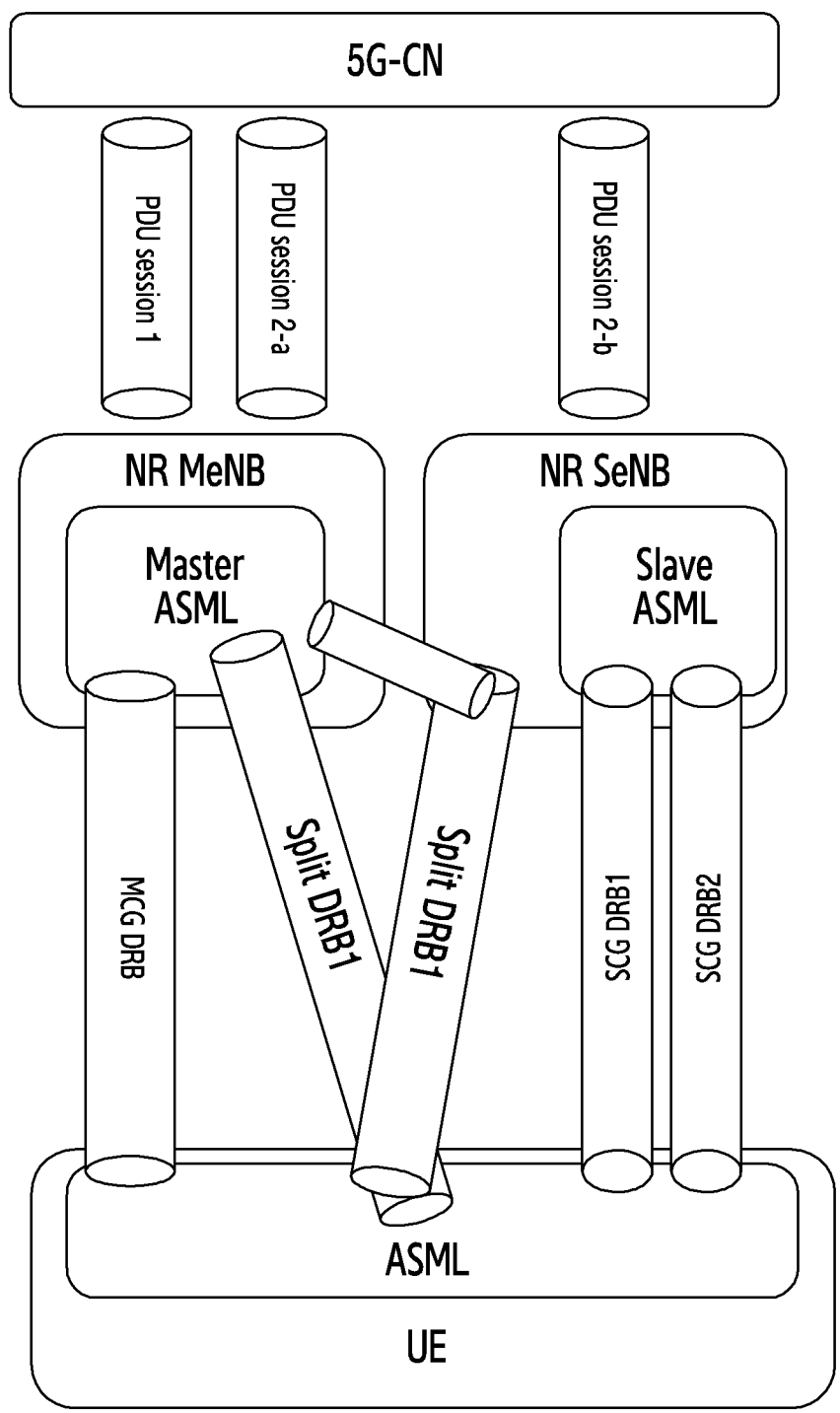
FIG. 17 NR QoS architecture, including ASML layer according to an embodiment of the invention.

FIG. 17 shows an embodiment of the present disclosure, highlighting the ASML layer, which is particularly involved in mapping QoS flows to DRBs. Here can be seen the Master ASML, running in the NR MeNB. In the Control Plane, it is responsible for all DRB management, in both the MeNB and the SeNB. It is also responsible for all QoS flow→DRB mapping control, in both the master and slave ASML, running in MeNB and SeNB respectively.

In the User Plane, it performs mapping of QoS flows to DRBs for MCG and MCG-split DRBs.

The Slave ASML, running in the SeNB, in the User Plane, performs mapping of QoS flows to DRBs for SCG DRBs.

It should be noted that responsibilities for MeNB and SeNB with respect to DRB management are the same in LTE+LTE DC as in NR+NR DC, with the addition of the ASML layer.

The table 5 below summarises the situation:

TABLE 5

| | MCG Bearer | MCG Split Bearer | SCG Bearer |
|---|---|---|---|
| 1. Responsibility for DRB management (establishment, release, modification) | MeNB | MeNB | MeNB |
| 2. Responsibility for ASML mapping configuration (only for NR + NR DC) | MeNB | MeNB | MeNB |
| 3. Responsibility for PDCP configuration | MeNB | MeNB | SeNB* |
| 4. Responsibility for lower layer configuration (RLC, MAC, L1) | MeNB | MeNB + SeNB | SeNB* |

Note that for the entries labelled SeNB*, the SeNB no longer receives a QCI for an SCG DRB, but a set of QoS profiles (belonging to the QoS flows mapped to the DRB) that have to be supported by the DRB. The SeNB takes these QoS profiles into account when configuring the lower layers.

The mapping of QoS flows (i.e. indicating which DRB is used for transferring packets) can either be explicitly signalled, or a 'reflective' approach can be taken whereby a signal header includes the QoS flow information.

Figure 18:
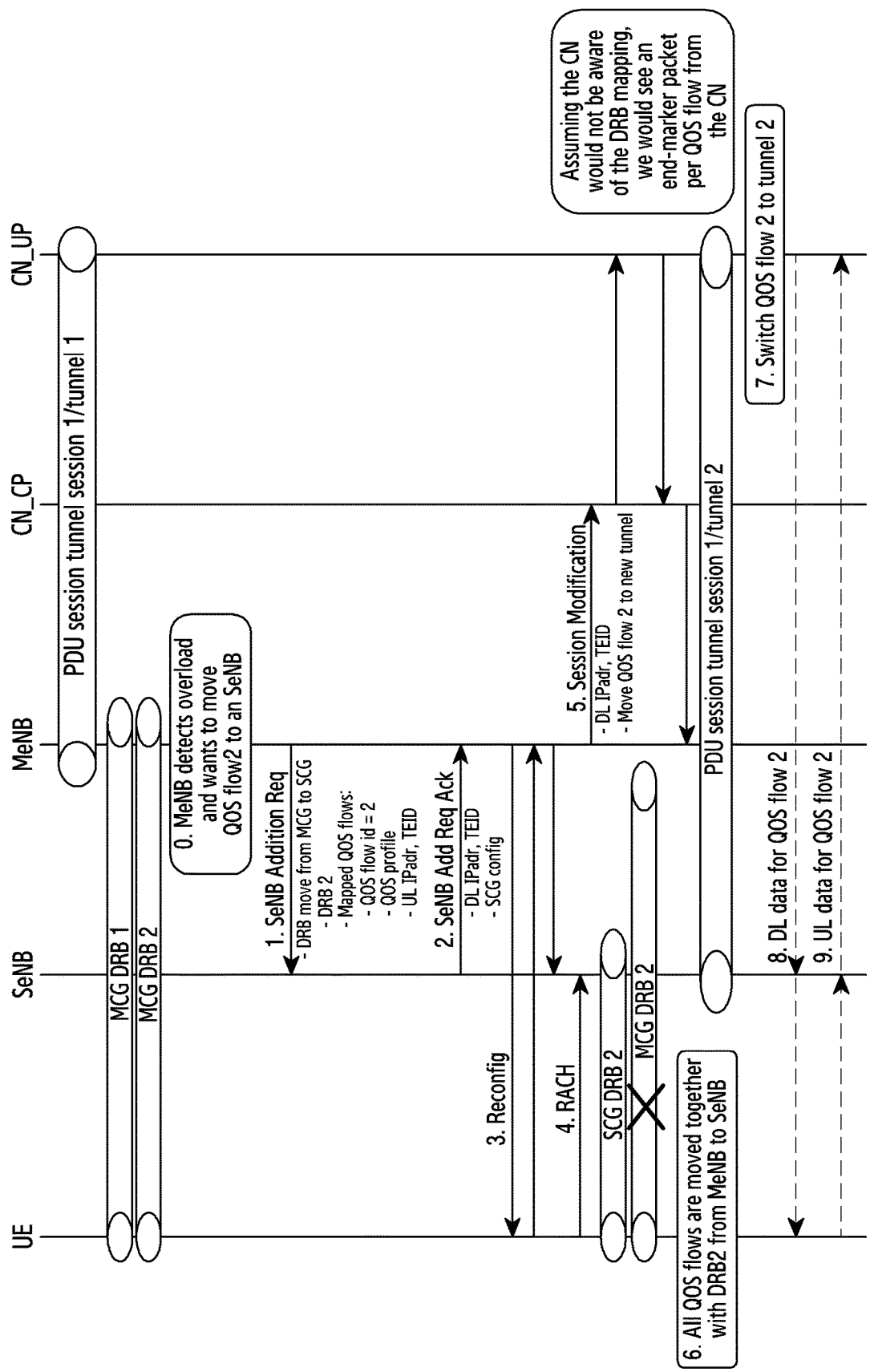
FIG. 18 shows a message flow diagram relating to MeNB offloading traffic by moving an entire DRB (DRB2) to SeNB, according to an embodiment of the invention.
Figure 19:
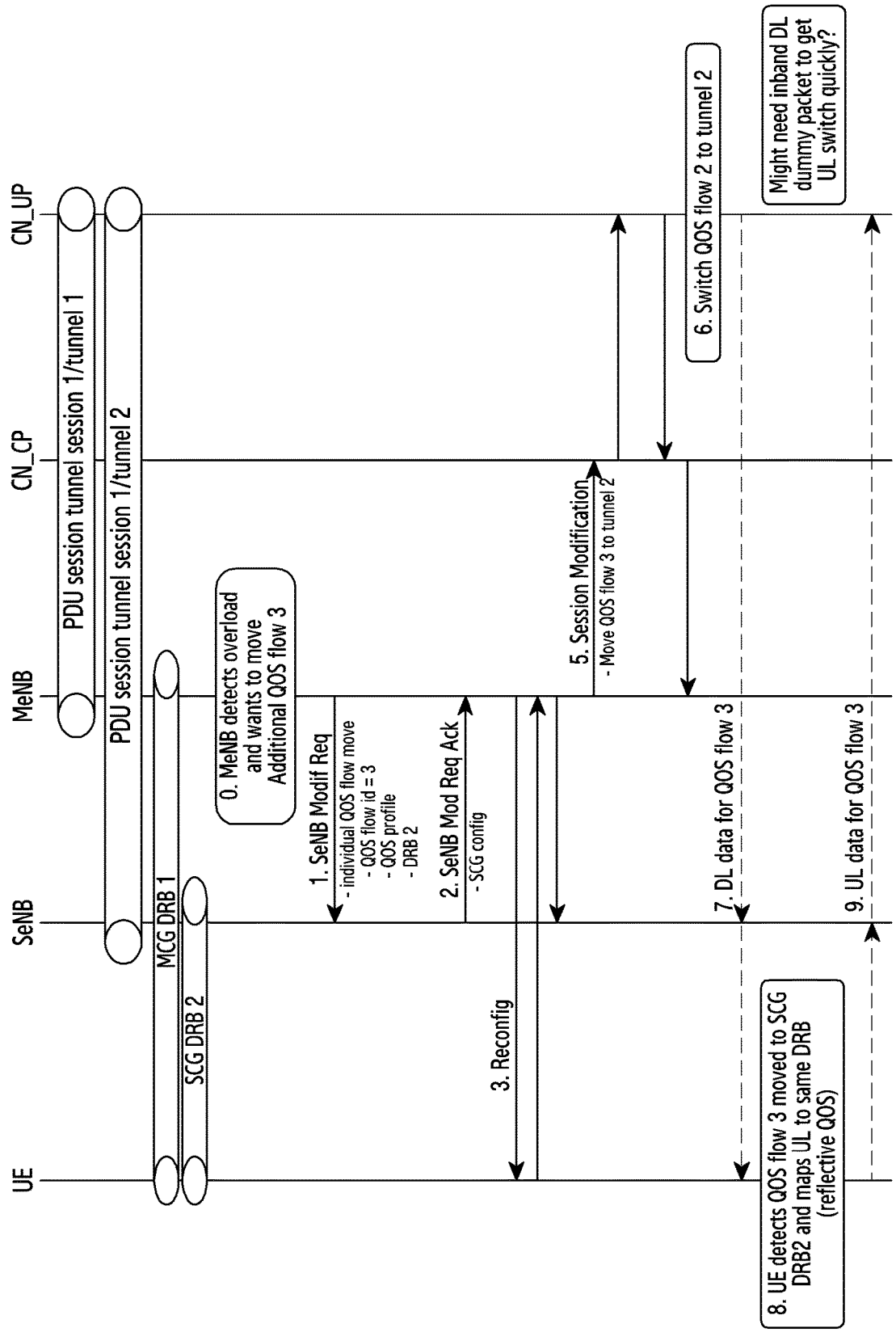
FIG. 19 shows a message flow diagram relating to initiating offloading of additional QoS flow (QoS flow 2) according to an embodiment of the invention.
Figure 20:
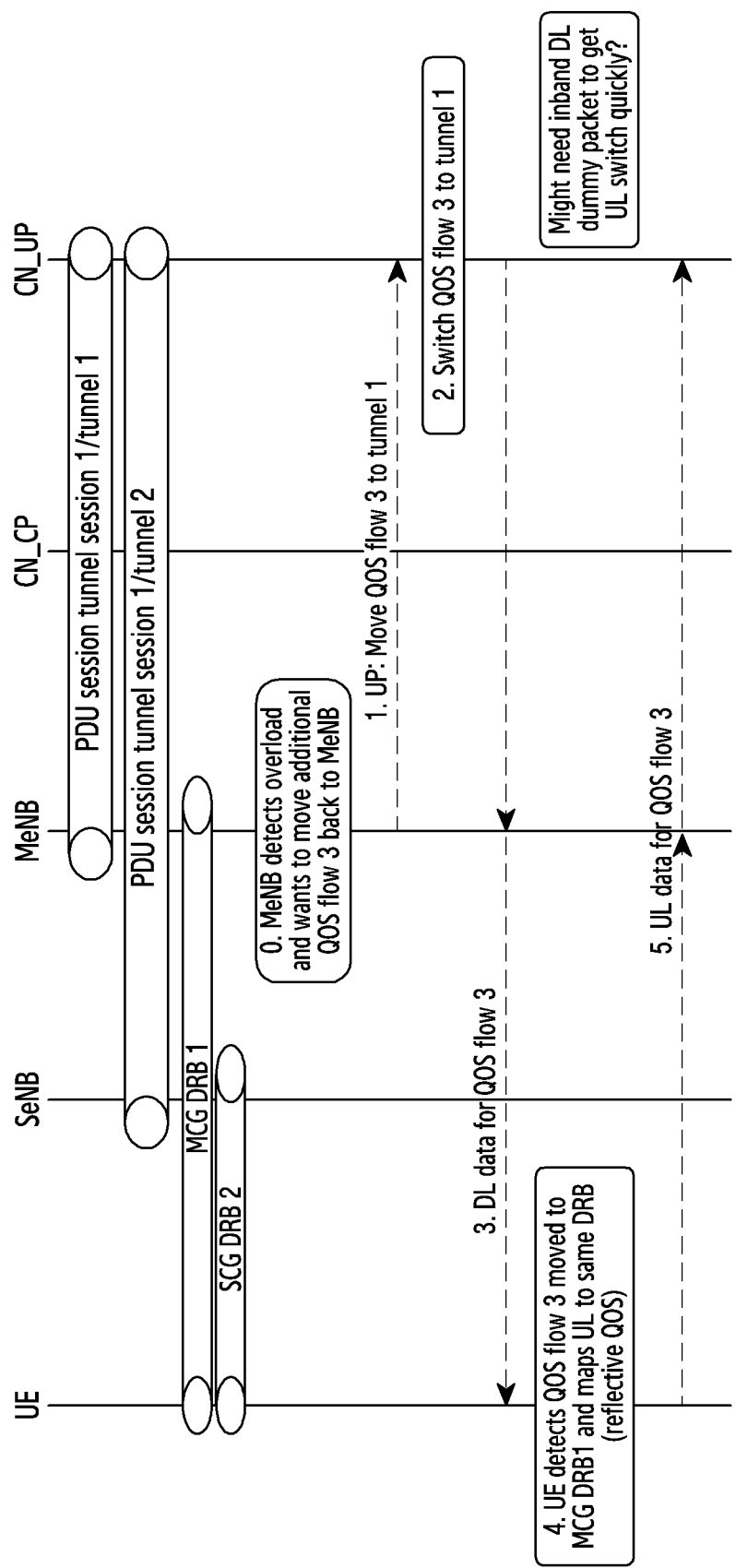
FIG. 20 shows a message flow diagram relating to initiating offloading of additional QoS flow (QoS flow 3) according to an embodiment of the invention.

FIGS. 18 to 20 illustrate signal flows associated with various embodiments and illustrative examples described previously.

FIG. 18 shows a signal flow associated with an MCG bearer→SCG bearer move at SeNB additions. This is an example of Level 1 mobility.

FIG. 19 illustrates an example of Level 2 mobility, with the movement of an additional QoS flow to the SeNB.

FIG. 20 shows an example of Level 2 mobility in the User Plane, To enable quick QoS flow switching between MeNB and SeNB, inband UP switching may be used over NG.

This could, for instance, be used in a situation after execution of signalling sequence shown in FIG. 19 to move QoS flow3 back to the MeNB.

It could also be used if, for instance, at the SeNB addition step, the SeNB is prepared (e.g. DRBs pre-established) for a number of QoS flows, even though these flows are not yet moved to the SeNB.

A potential problem may arise If the DL packet on the new DRB arrives earlier at the UE than the last retransmission of a packet on the old DRB. In this case, the UE may ping-pong back the QoS-flow to the old DRB. This is because of reflective QoS i.e. the UE adjusting the QoS flow to DRB mapping it uses in the uplink is based on the packets it receives in the downlink. In other words, if the UE receives a packet of a given QoS flow on another DRB than the DRB previously used, it may update the QoS flow to DRB mapping i.e. it may use the DRB newly used in the downlink for transmission of subsequent packets of the concerned QoS flow in the uplink.

This could happen e.g. at handover. As an example, consider a Source has 3 DRB's:

DRB1: QoS flow 1, 2, 3
DRB2: QoS flow 4, 5
DRB3: QoS flow 6

Assume that the target MeNB does not like the mapping of QoS flows 1, 2, 3 and wants to handle QoS flow 3 at a separate DRB. Then, the target eNB would signal the following configuration:

Continue DRB 1, 2, 3 (automatically moves QoS flows with it, if no additional QOS flow moves are configured)
Establish DRB4
Move QOS flow 3 to DRB4

The Target MeNB will receive packets for QOS flow 3 as part of DRB1 forwarding (FORMAT1 only for QOS flow 3), and as FORMAT2 packets which should be transmitted on DRB2 in the target eNB. If the Target eNB starts immediately to send packets on DRB2, while the retransmissions on DRB1 are still ongoing, the following may happen:

The UE receives a packet for QOS flow 3 on DRB2. It updates its UL mapping and sends UL packets for QOS flow 3 on DRB2.

Next, the UE receives a packet for QOS flow 3 on DRB1 (retrans). The UE again updates its mapping and sends UL packets for QOS flow 3 on DRB1.

Next, the UE receives a DL packet for QOS flow3 on DRB2 and so on.

Note that the same problem may exist even if we have the QOSflow→DRB mapping signalled in the CP at handover i.e. subsequent re-transmissions may cause the UE to map the QoS flow back to the previous DRB (i.e. a pong):

The UE receives updated mapping QOSflow3→DRB4 in handover command

Next, the UE receives DL packet on DRB1 for QOS flow 3, and the UE updates mapping to DRB1 for QOS flow 3

It can be seen from the following that it is possible for synchronisation errors and signalling problems to spiral.

One solution to this problem is for the network to ensure that it is not allowed to happen. This can be achieved by:

Intra-eNB: Wait for transmitting the packet on the new DRB until in-sequence delivery of relevant PDCP PDU's on old DRB has been confirmed by RLC.

Handover: Same behaviour as intra-eNB, above, but the target eNB ensures this

Inter-MeNB/SeNB: This configuration renders it more difficult to guarantee. i.e. the MeNB would have to stop DL transmission on MCG bearer, wait until delivery confirmation (discard all DL packets that arrive in the mean time assuming no forwarding), and only after RLC confirmation, inform CN to route via SeNB.

Another solution is to use inband "Packet subject to reflective QOS" marker. i.e. only set it for some packets on the new DRB and not set it for the last packets on the previous DRB. This mayt only result in some out of sequence delivery to higher layers, but no UL QOS flow routing ping pong or back and forth.

The preferred option would appear to be the second solution presented above, which also works in combination with CP signalling, e.g.:

Target eNB signals in handover command flow has to move from DRB1 to DRB2

Immediately after handover:

UL: UE only routes packets on DRB2.

DL: UE may receive (even in parallel) some packets (late retrans) over DRB1 (no inband indicator) and rest over DRB2 (with inband indicator)

According to various embodiments of the present disclosure, a method of managing a data flow in a wireless communication system comprises controlling a quality of service (QoS) flow to be transferred from a first data radio bearer (DRB) to a second DRB. Herein the QoS flow is a flow of data carried by a DRB between a terminal and at least one network entity.

According to various embodiments of the present disclosure, a plurality of QoS flows of the terminal are routed via at least two network entities sequentially, simultaneously, or a combination of both.

According to various embodiments of the present disclosure, at least one QoS flow of the terminal is handed from a first network entity to a second network entity.

According to various embodiments of the present disclosure, the QoS flow is transferred individually while at least one other QoS flow is maintained in the first DRB.

According to various embodiments of the present disclosure, the first DRB is a source DRB, and the second DRB is a target DRB.

According to various embodiments of the present disclosure, the QoS flow is transferred along with at least one other QoS flow from the first DRB to the second DRB.

According to various embodiments of the present disclosure, the QoS flow and the at least one other QoS flow are transferred:

from a source master node (MN) or cell to a target MN or cell;
between a MN or cell and a secondary node (SN) or cell;
from a master cell group (MCG) bearer type to MCG-split bearer type; or
to conform to long term evolution (LTE) and LTE-new radio (NR).

According to various embodiments of the present disclosure, the transferring of the QoS flow is associated with a handover from a source eNB to a target eNB. Herein, the handover is a normal handover where a configuration in the source eNB is available for the target eNB, or a full configuration handover where the target eNB configures a new access stratum configuration.

According to various embodiments of the present disclosure, the target MN or cell determines whether to maintain or change QoS flow to DRB mapping.

According to various embodiments of the present disclosure, the MN determine whether to offload at least one QoS flow of a packet data unit (PDU) session to an SN and requesting to transfer the QoS flow.

According to various embodiments of the present disclosure, the MN offloads all QoS flows mapped to the associated DRB to an SN.

According to various embodiments of the present disclosure, upon transferring a QoS flow from a first network entity to a second network entity, data packets are forwarded from the first network entity to the second network entity.

According to various embodiments of the present disclosure, a method of managing a data flow in a wireless communication network comprises generating a first backhaul tunnel between a network entity and a first node. Herein, a first backhaul tunnel is established between the network entity and a second node, the first backhaul tunnel is associated with a packet data unit (PDU) session and the second backhaul tunnel is associated with the PDU session, and the network entity operates in a dual connectivity configuration where a communication between a terminal and the network entity is performed over the first node and the second node.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Furthermore, embodiments of the invention may be defined in terms of methods, corresponding apparatus or devices and programs for computers.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a core network entity, the method comprising:
   receiving, from a master node (MN), a session modification message for offloading at least one quality of service (QoS) flow of a protocol data unit (PDU) session from the MN to a secondary node (SN), wherein the PDU session comprises a plurality of QoS flows of the PDU session; and
   transmitting, to the MN, a response message,
   wherein the session modification message includes information of the at least one QoS flow,
   wherein the MN is configured with a first layer for mapping between a QoS flow and a data radio bearer (DRB),
   wherein the SN is configured with a second layer for mapping between a QoS flow and a DRB, and
   wherein the first layer and the second layer are configured for the PDU session for the offloading of the at least one QoS flow of the PDU session between the MN and the SN.

2. The method of claim 1, wherein one or more QoS flows of the plurality of QoS flows is mapped to a split bearer in the SN.

3. The method of claim 1,
   wherein the QoS flow of a terminal is offloaded from the MN to the SN, and
   wherein the MN and the SN are connected to 5th generation core network (5GC).

4. The method of claim 1, wherein the session modification message includes information on a tunnel of the SN, which is associated with the at least one QoS flow.

5. The method of claim 1, further comprising:
   receiving, from the MN, another session modification message for offloading at least one another QoS flow of the PDU session from the SN to the MN.

6. A method performed by a secondary node (SN) for dual connectivity in a wireless communication system, the method comprising:
   receiving, from a master node (MN), an addition request message associated with at least one quality of service (QoS) flow of a protocol data unit (PDU) session for offloading the at least one QoS flow of the PDU session;
   transmitting, to the MN, an addition request acknowledge message, in response to the addition request message; and
   receiving, from the MN, a radio resource control (RRC) reconfiguration complete message,
   wherein the MN is configured with a first layer for mapping between a QoS flow and a data radio bearer (DRB),
   wherein the SN is configured with a second layer for mapping between a QoS flow and a DRB, and
   wherein the first layer and the second layer are configured for the PDU session for the offloading of the at least one QoS flow of the PDU session between the MN and the SN.

7. The method of claim 6,
   wherein the addition request message includes uplink tunnel information used at the MN, and
   wherein the addition request acknowledge message includes downlink tunnel information used at the SN.

8. The method of claim 6, further comprising:
   performing a random access procedure with a user equipment (UE) for delivering a packet of the at least one QoS flow of the PDU session.

9. The method of claim 6, further comprising:
   in case that an additional QoS flow of the PDU session needs to be offloaded, receiving a modification request message associated with the additional QoS flow; and
   transmitting a modification request acknowledge message, in response to the modification request message.

10. The method of claim 6, wherein the at least one QoS flow of the PDU session is offloaded determined by the MN and the MN and the SN are connected to 5th generation core network (5GC).

11. A core network entity, comprising:
   at least one transceiver; and
   at least one processor coupled to the at least one transceiver and configured to:
      receive, from a master node (MN), a session modification message for offloading at least one quality of service (QoS) flow of a protocol data unit (PDU) session from the MN to a secondary node (SN), wherein the PDU session comprises a plurality of QoS flows of the PDU session, and
      transmit, to the MN, a response message,
   wherein the session modification message includes information of the at least one QoS flow,
   wherein the MN is configured with a first layer for mapping between a QoS flow and a data radio bearer (DRB),
   wherein the SN is configured with a second layer for mapping between a QoS flow and a DRB, and
   wherein the first layer and the second layer are configured for the PDU session for the offloading of the at least one QoS flow of the PDU session between the MN and the SN.

12. The core network entity of claim 11, wherein one or more QoS flows of the plurality of QoS flows is mapped to a split bearer in the SN.

13. The core network entity of claim 11,
   wherein the QoS flow of a terminal is offloaded from the MN to the SN, and
   wherein the MN and the SN are connected to 5th generation core network (5GC).

14. The core network entity of claim 11, wherein the session modification message includes information on a tunnel of the SN, which is associated with the at least one QoS flow.

15. The core network entity of claim 11, wherein the at least one processor is further configured to:
   receive, from the MN, another session modification message for offloading at least one another QoS flow of the PDU session from the SN to the MN.

16. A secondary node (SN) for dual connectivity in a wireless communication system, the SN comprising:
   at least one transceiver; and
   at least one processor operably coupled to the at least one transceiver and configured to:
      receive, from a master node (MN), an addition request message associated with at least one quality of service (QoS) flow of a protocol data unit (PDU) session for offloading the at least one QoS flow of the PDU session, transmit, to the MN, an addition request acknowledge message, in response to the addition request message, and receive, from the MN, a radio resource control (RRC) reconfiguration complete message, wherein the MN is configured with a first layer, for mapping between a QoS flow and a data radio bearer (DRB), wherein the SN is configured with a second layer for mapping between a QoS flow and a DRB, and wherein the first layer and the second layer are configured for the PDU session for the offloading of the at least one QoS flow of the PDU session between the MN and the SN.

17. The SN of claim 16, wherein the addition request message includes uplink tunnel information used at the MN, and wherein the addition request acknowledge message includes downlink tunnel information used at the SN.

18. The SN of claim 16, wherein the at least one processor is further configured to:

perform a random access procedure with a user equipment (UE) for delivering a packet of the at least one QoS flow of the PDU session.

19. The SN of claim 16, wherein the at least one processor is further configured to:

in case that an additional QoS flow of the PDU session needs to be offloaded, receive a modification request message associated with the additional QoS flow; and transmit a modification request acknowledge message, in response to the modification request message.

20. The SN of claim 16, wherein the at least one QoS flow of the PDU session is offloaded determined by the MN and the MN and the SN are connected to 5th generation core network (5GC).

* * * * *